United States Patent
Bent et al.

(10) Patent No.: US 8,260,705 B1
(45) Date of Patent: *Sep. 4, 2012

(54) SYSTEMS, METHODS AND PROGRAM PRODUCTS FOR DEPOSIT AND WITHDRAWAL PROCESSING

(75) Inventors: Bruce Bent, Manhasset, NY (US); Bruce Bent, II, Manhasset, NY (US); David Edgar Gareis, Maplewood, NJ (US); Thomas J. O'Donnell, Bay Shore, NY (US)

(73) Assignee: Island Intellectual Property LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,974

(22) Filed: Dec. 21, 2010

Related U.S. Application Data

(63) Continuation-in-part of application No. 12/340,026, filed on Dec. 19, 2008, now Pat. No. 8,032,456, and a continuation-in-part of application No. 12/829,961, filed on Jul. 2, 2010, now Pat. No. 7,996,308, which is a continuation of application No. 11/689,247, filed on Mar. 21, 2007, now Pat. No. 7,752,107.

(60) Provisional application No. 61/027,643, filed on Feb. 11, 2008, provisional application No. 60/892,107, filed on Feb. 28, 2007, provisional application No. 60/895,320, filed on Mar. 16, 2007.

(51) Int. Cl.
*G06Q 40/00* (2012.01)
(52) U.S. Cl. ............. 705/40; 705/42; 235/379; 235/380
(58) Field of Classification Search .................. 705/40, 705/42; 235/379, 380
See application file for complete search history.

(56) References Cited

U.S. PATENT DOCUMENTS

| | | | |
|---|---|---|---|
| 4,232,367 A | 11/1980 | Youden et al. |
| 4,346,442 A | 8/1982 | Musmanno |
| 4,376,978 A | 3/1983 | Musmanno |
| 4,597,046 A | 6/1986 | Musmanno et al. |
| 4,674,044 A | 6/1987 | Kalmus et al. |
| 4,694,397 A | 9/1987 | Grant et al. |

(Continued)

FOREIGN PATENT DOCUMENTS

EP 0 608 322 7/1998

(Continued)

OTHER PUBLICATIONS

U.S. Appl. No. 11/641,046, filed Dec. 19, 2006, Bruce Bent et al.

(Continued)

*Primary Examiner* — Daniel Felten
(74) *Attorney, Agent, or Firm* — Foley & Lardner LLP

(57) ABSTRACT

A method, system and program product, the method comprising: obtaining a plurality of net credit/debit amounts during a month period; generating data for depositing/transferring funds to or withdrawing/transferring funds from at least one of one or more aggregated deposit accounts multiple times in a month period, the data generating step comprising generating data for instructions for making a withdrawal/transfer from funds held at one of the one or more depository institutions more than six (6) times during the month period, comprising presenting instructions to the respective one depository institution using one or more of the methods: in person, or by mail, or, by messenger, or by telephone and distributed by mail, or by automated teller machine, or a combination thereof for substantially all of the withdrawals/transfers except for a set of at least one but not more than six withdrawals within the month period.

29 Claims, 6 Drawing Sheets

U.S. PATENT DOCUMENTS

| | | |
|---|---|---|
| 4,700,297 A | 10/1987 | Hagel et al. |
| 4,751,640 A | 6/1988 | Lucas et al. |
| 4,774,663 A | 9/1988 | Musmanno et al. |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,206,761 B2 | 4/2007 | Colvin |
| 7,216,100 B2 | 5/2007 | Elliott |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,752,107 B1 | 7/2010 | Bent et al. |
| 7,752,129 B2 | 7/2010 | Bent et al. |
| 7,769,688 B1 | 8/2010 | Bent et al. |
| 7,797,207 B1 | 9/2010 | Dilip et al. |
| 7,809,640 B1 | 10/2010 | Bent et al. |
| 7,873,573 B2 | 1/2011 | Realini |
| 7,895,098 B2 | 2/2011 | Beard |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,917,433 B2 | 3/2011 | Jacobsen |
| 7,921,057 B1 | 4/2011 | Jacobsen |
| 7,933,821 B1 | 4/2011 | Bent et al. |
| 7,996,308 B1 | 8/2011 | Bent et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,005 B2 | 11/2011 | Jacobsen |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del et al. |
| 2004/0177036 A1 | 9/2004 | Nutahara et al. |
| 2004/0249741 A1 | 12/2004 | Understein |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |

| | | | |
|---|---|---|---|
| 2005/0114246 | A1 | 5/2005 | Coloma |
| 2005/0154662 | A1 | 7/2005 | Langenwalter |
| 2005/0228733 | A1 | 10/2005 | Bent et al. |
| 2006/0047593 | A1 | 3/2006 | Naratil et al. |
| 2006/0106703 | A1 | 5/2006 | Del et al. |
| 2006/0155644 | A1 | 7/2006 | Reid et al. |
| 2006/0167773 | A1 | 7/2006 | Yang et al. |
| 2006/0212389 | A2 | 9/2006 | Bent et al. |
| 2006/0213980 | A1 | 9/2006 | Geller et al. |
| 2006/0273152 | A1 | 12/2006 | Fields |
| 2007/0043666 | A1 | 2/2007 | Burdette |
| 2007/0118449 | A1 | 5/2007 | De La Motte |
| 2007/0130065 | A1 | 6/2007 | Staab et al. |
| 2007/0143196 | A1 | 6/2007 | Colvin |
| 2007/0255655 | A1 | 11/2007 | Kemper et al. |
| 2007/0271174 | A2 | 11/2007 | Bent et al. |
| 2007/0276752 | A1 | 11/2007 | Whiting et al. |
| 2007/0288400 | A1 | 12/2007 | Menon |
| 2008/0015985 | A1 | 1/2008 | Abhari et al. |
| 2008/0046358 | A1 | 2/2008 | Holm-Blagg et al. |
| 2008/0065532 | A1 | 3/2008 | De La Motte |
| 2008/0097899 | A1 | 4/2008 | Jackson et al. |
| 2008/0120228 | A1 | 5/2008 | Bent et al. |
| 2008/0133280 | A1 | 6/2008 | Ziegler |
| 2008/0133396 | A1 | 6/2008 | De La Motte |
| 2008/0222053 | A1 | 9/2008 | Jacobsen |
| 2009/0006985 | A1 | 1/2009 | Fong et al. |
| 2009/0012899 | A1 | 1/2009 | Friesen |
| 2009/0138412 | A1 | 5/2009 | Jacobsen |
| 2009/0327154 | A1 | 12/2009 | Van Vooren et al. |

FOREIGN PATENT DOCUMENTS

| | | |
|---|---|---|
| JP | 10-049590 A | 2/1998 |
| WO | WO-95/23379 A1 | 8/1995 |
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 11/840,052, filed Aug. 16, 2007, Bruce Bent et al.
U.S. Appl. No. 11/840,060, filed Aug. 16, 2007, Bruce Bent et al.
FDIC Federal Register Citations: Email from Bert Ely to Comments, Mar. 8, 2006, Subject: Large-Bank Deposit Insurance Determination Proposal—RIN 3064-AC98—Reg@fdic.gov. Attached, also from FDIC Federal Register Citations: Email From American Banker, by Bert Ely, Feb. 24, 2006, Viewpoint: FDIC's Account-Link Plan a Pointless, Costly Threat.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
U.S. Appl. No. 12/025,402, filed Feb. 4, 2008, Bent.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent II et al.
U.S. Appl. No. 12/829,961, filed Jul. 2, 2010, Bruce Bent, et al.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance 21, 2003 Sharing," American Banker Online, 4 Sheets, Jan. 21, 2003.
Board of Governors of the Federal Reserve System, 1984 Fed. Res. Interp. Ltr. Lexis 56, Nov. 16, 1984, 3 Sheets.
Board of Governors of the Federal Reserve System, 1988 Fed. Res. Interp. Ltr. Lexis 141, Jun. 22, 1988, 3 Sheets.

Board of Governors of the Federal Reserve System, 1989 Fed. Res. Interp. Ltr. Lexis 154, Jun. 21, 1989, 2 Sheets.
Board of Governors of the Federal Reserve System, 1989 Fed. Res. Interp. Ltr. Lexis 77, Mar. 14, 1989, 2 Sheets.
Board of Governors of the Federal Reserve System, 1990 Fed. Res. Interp. Ltr. Lexis 94, Feb. 1, 1990, 1 Sheet.
Board of Governors of the Federal Reserve System, 1991 Fed. Res. Interp. Ltr. Lexis 232, Jan. 30, 1991, 2 Sheets.
Board of Governors of the Federal Reserve System, 1994 Fed. Res. Interp. Ltr. Lexis 156, Jun. 24, 1994, 3 Sheets.
Board of Governors of the Federal Reserve System, 1994 Fed. Res. Interp. Ltr. Lexis 314, Oct. 17, 1994, 2 Sheets.
Board of Governors of the Federal Reserve System, 1994 Fed. Res. Interp. Ltr. Lexis 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendent Total Bank Solutions, LLC's responses to Double Rock'Common interrogatory Nos. 1-10 to defendents, Reservation of Right, Civil Action No. 09 Civ. 2675 (VM) (AJP).
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_...
Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003. vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/, 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.

Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.

Lavine, "Check Out High-Yield Checking Accounts," Broward Daily Business Review, vol. 39, No. 102, 2 Sheets, Apr. 27, 1998.

Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.

Lawsuit by Carlo DeBlasio et al. against Merrill Lynch & Co., Inc. et al., Declaration of Andrew W. Stern, including Exhibits A, B, C, D, E and F, Nov. 12 2007, Case No. 07-cv-318 (RJS) (Document 59).

Lawsuit by Carlo DeBlasio et al. against Merrill Lynch & Co., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", Feb. 5, 2008.

Lawsuit by Carlo DeBlasio et al. against Merrill Lynch & Co., Declarartion of Joel P. Laitman in Support of Plaintiffs' Memorandum of Law in Opposition to Defendents' Motion for Dismissal of the Second Amended Class Action Complaint, Including: . . . Feb. 5, 2008 (Document 72).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).

Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).

Lawsuit by Carlo DeBlasio et al. against Merrill Lynch & Co., Inc. et al., Declaration of Mathew J. Terry in Support of Motion to Dismiss by Defendents Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).

Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).

lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendents Eachovia Corp., Wachovia Securities, LLC, Wachovia bank N.A., and Wachovia bank of Delaware, N.A., including Exhibits A and B, Mar. 6, 2008, Case No. 07-cv-318 (RJS) (Document 79).

Lawsuit by Carlo DeBlasio, et al. against Merrill Lynch & Co., Inc., et al., Opinion and Order Regarding Motions, Jul. 27, 2009, Case No. 07 CIV 318(RJS).

Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by Island Intellectual Property LLC and lntrasweep LLC against Institutional Deposits Corp. The Island Plaintiffs' Complaint against Defendant Institutional Deposits Corp., Nov. 4, 2009, Civil Action No. 1 09-CV-3079.

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC against Institutional Deposits Corp., Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC) (Document 16).

Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM) (Document 114).

Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1.119 pages.

Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).

Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.

Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).

Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AGg Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Amecias' Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Intel-financial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC agains Double Rock Corporation p/k/a Reserve Management Corporation and Lids Capital LLC, Amended Complaint, Mar. 27, 2009, Civil Action No. 1:09 CV 316.

Lawsuit by Promontory Interfinancial Network, LLC against Double Management Corporation, p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Joseph A. DiNuzzo, Counsel, Oct. 20, 1999, FDIC, Federal Deposit Insurance Corporation, 1 Sheet.

Letter From Merle Y. Waldman, LEXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve Systesm; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdefte, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products For Unusual Times," Securities Data Publishing on Wall Street, 6 Sheets, May 1, 2001.
McReynolds, "The Power of Cash: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000 4 Sheets.
Merrill Lynch Announces Beyond Banking, The Power of Advice for Smarter Cash Management, Jan. 8, 2 Sheets.
Merrill Lynch, Pierce, Fenner & Smith Incorporated, "Information Statement," 2000, 12 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Funds, 1 Sheet. Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Fund Dealers Association, 1 page, (http://www.mfda.ca/.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD,Nov. 12, 2002, 4 Sheets.
O'Brian, "Money-Market Funds Suit Many Investors, But Proud Creator Frets About Extra Risk," Re-Printed From The Wall Street Journal, Monday, Nov. 6, 2000, Dow Jones & Company, Inc., Nov. 25, 2002, 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatoty Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Insured Deposits, Serial No. 76/315,600, Issued.
Ring, National /Global, "Amex Spans the Globe in Retail Bank Buildup," Nov. 27, 2000, 1 Sheet.
Share, "New Service Skirts FDIC's $100K Limit," Dialog Web Command Mode,'2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before The Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch Mmda Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth Retention, For Immediate Release, May 23, 2001, 1 Sheet.
The Reserve Funds, Reserve Management and Irwin Union Bank and Trust Company Partner to Offer The Reserve Return Sweep, For Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. http://www.ther.com/bank/bank_insdep.shtml.
The Reserve, "Reserve Insured Deposits," 2 Sheets, Oct. 4, 2006, http://www.ther.com/ps/ps_fif.html.
The Reserve, "What Sets Us Apart," 2 Sheets, Oct. 4, 2006, http://www.ther.com/bank/bank_wsua.shtnnl.
The Unmatched Sweep Solution From The Cash Management Expert, 2 Sheets.

Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http//www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBs Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Leading Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter from Oliver I. Ireland, Associate General Counsel, Board of Governors of the Federal Reserve Statement, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccountSM and Insurance Plus Service Agreement, Schedule A, 3 sheets.
Investors MoneyAccountSM (an FDIC-insured money market account), 4 sheets.
Investors MoneyAccountSM The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, Jul. 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93—35, sheets. Jun. 28, 1993, 2 sheets.
§204.134, 12 CFR Ch. 11 (Jan. 1, 2009 Edition), 2 sheets.

Money Fund $$ Moving to Bank Deposits, 6 FRC Monitor, Dec. 2003, 2 sheets.
Crane, P. & Krasner, Mike, An iMoney Net Special ReportTM , "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.
Interest Rate Review © A Publication of Meyer Weekly Interest Rate Survey, A Look At Tiers, vol. II, No. 4, Apr. 1987, 6 pgs.
Interest Rate Review © A Publication of Meyer Weekly Interest Rate Survey, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", on Wall Street, Nov. 2000, 1 sheet.
Quest Insured Account, Quest essentials, 3 sheets.
Quest Insured Account, Information Statement, 5 sheets.
OCC Insured Bank Deposit Account, 3 sheets.
Insured Bank Deposit Account, Information Statement, Jul. 1, 2000, 2 sheets.
Letter from Marilyn J. Hensle, announcing Salomon Smith Barney Bank Deposit Program. SM, with Q&A, 14 sheets.
Bank Deposit program Disclosure Statement, Salomon Smith Barney, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account(IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010 3 pgs.
Folio Investing: Brokerage Features >> Cash Investments>> Cash Sweep FAQ, Jan. 18, 2010 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Dension Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.

Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/ag/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured AccountSM , PrimeVest, http://primevest.com/flexInsured_account.psp, Jan. 14, 2010, 1 sheet.
FlexInsuredSM Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneage.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndorscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insuredepostsonline.com , Jan. 15, 2010, 1 sheet.
Protect your cash portfolio!, www.insureddepositsonline.com/component/option.com_frontpage/itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.puiaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checkino-personalinsured.htm, Dec. 8, 2009, 1 sheet.
Personal Banking, Insured Deposit Program, Pulaski Ban, www.pulaskibankstl.com/personalichecking-personalinsured.htm, May 14, 2009; 1 sheet.

Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep-Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/..., Nov. 2, 2009, 2 sheets.
Kentucky Bankers Association, Alternative for excess deposit coverage Free Webiners, http://209.235.145/cgi-bin/websuite/tcsassnwebsuite.pl?..., Nov. 2, 2009, 2 sheets.
Kentucky Bankers Association, Alternative for excess deposit coverage Free Webiners, http://209.235.145/cgi-bin/websuite/tcsassnwebsuite.pl?..., Nov. 2, 2009, 2 sheets.
Kentucky Bankers Association Detailed listening, http://member.kybanks.com/source/members..., Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Defendant Institutional Deposits Corp.'s Defendant Institutional Deposits Corp.'s Preliminary Invalidity Contentions, Case No. 09-CV-03079-JEC, received in Mar. 2010.
Exhibit 1, Invalidity Chart: IMA and Insurance Plus Service Agreement, U.S. Patent No. 7,509,286, received in Mar. 2010, 21 pgs.
Exhibit 2, Invalidity Chart: Investors Money AccountSM Systems, U.S. Patent No. 7,509,286, received in Mar. 2010, 26 pgs.
Exhibit 3, Invalidity Chart: Insured Money Account System, U.S. Patent No. 7,509,286, received in Mar. 2010, 26 pgs.
Exhibit 4, Invalidity Chart: U.S. Patent No. 4,985,833 (Oncken), U.S. Patent No. 7,509,286, received in Mar. 2010, 21 pgs.
Exhibit 5, Invalidity Chart: First City Bank of Texas' Insured Savings Program, U.S. Patent No. 7,509,286, received in Mar. 2010, 39 pgs.
Exhibit 6, Invalidity Chart: Quest Insured Account, U.S. Patent 7,509,286, received in Mar. 2010, 19 pgs.
Exhibit 7, Invalidity Chart: CIBC World Markets—Insured Bank Deposit Account, U.S. Patent No. 7,509,286, received in Mar. 2010, 16 pgs.
Exhibit 8, Invalidity Chart: Merrill Lynch CMA/ISA Service, U.S. Patent No. 7,509,286, received Mar. 2010, 72 pgs.
Exhibit 9, Invalidity Chart: 1983 Fed Letter, U.S. Patent No. 7,509,286, received in Mar. 2010,, 16 pgs.
Exhibit 10, Invalidity Chart: Merrill Lynch Banking Advantage Program ("MLBA Program"), U.S. Patent No. 7,509,286, received in Mar. 2010,, 22 pgs.
Exhibit 11, Invalidity Chart: Merrill Lynch & You + MLBA Information Statement, U.S. Patent No. 7,509,286, received in Mar. 2010,, 18 pgs.
Exhibit 12, Invalidity Chart: Smith Barney Insured Deposit Account, U.S. Patent No. 7,509,286, received in Mar. 2010, 22 pgs.
Exhibit 13, Invalidity Chart: Smith Barney Bank Deposit Program, U.S. Patent No. 7,509,286, received in Mar. 2010, 18 pgs.
Exhibit 14, Invalidity Chart: Alliance Insured Account, U.S. Patent No. 7,509,286, received in Mar. 2010, 16 pgs.
Exhibit 15, Invalidity Chart: Reserve's American Express Presentation, U.S. Patent No. 7,509,286, received in Mar. 2010, 16 pgs.
Exhibit 16, Invalidity Chart: U.S. Patent No. 7,376,606 (Jacobsen), U.S. Patent No. 7,536,350, received in Mar. 2010, 6 pgs.
Exhibit 17, Obviousness Combinations Chart, U.S. Patent No. 7,509,286, received in Mar. 2010, 351 pgs.
U.S. Appl. No. 12/453,390, filed May 8, 2009, Bruce Bent.
*Island Intellectual Property LLC et al. v. Deutsche Bank AG, et al.*; Memorandum and Order; Case 1:09-cv-02675-KBF; Doc. 289; Feb. 14, 2012; pp. 1-28.
*Island Intellectual Property LLC et al. v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.

*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.

*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.

*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp 1-10.

*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.

*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.

*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Lawsuit by *Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC, et al. v. Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.

Lawsuit by *Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.

Lawsuit by *Island Intellectual Property LLC, et al. v. Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.

Lawsuit by *Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.

Lawsuit by *Island Intellectual Property LLC, et al. v. Deutsche Bank Trust Company Americas, et al.*; Order; Dec. 7, 2011; Case 1:09-cv-02675-VM, Document 212.

Lawsuit by *Island Intellectual Property LLC, et al. v. Deutsche Bank Trust Company Americas, et al.*; Special Master's Report and Recommended Decision on Defendants' Summary Judgment Motion of Invalidity Under 35 U.S.C. § 101; Dec. 19, 2011.

Lawsuit by *Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.

Martens, Don W.; Letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28, 2011; Case 1:09-cv-02675-VM; Document 211.

Martens, Don W.; Letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.

Knight-Ridder; Money Matters, Tips you can use—Limits Apply as FDIC Insurance Covers Depositor, Not Account; Chicago Tribune; Feb. 4, 1998; 2 pages.

Scottrade Bank Deposit Program—Terms, Conditions & Disclosures; Author unknown; 8-11; pp. 1-3.

SYSTEMS, METHODS AND PROGRAM PRODUCTS FOR DEPOSIT AND WITHDRAWAL PROCESSING

CROSS-REFERENCE TO RELATED PATENT APPLICATIONS

This application is a Continuation-In-Part of U.S. application Ser. No. 12/340,026, filed Dec. 19, 2008, which claims priority from Provisional Application U.S. Application 61/027,643, filed Feb. 11, 2008. This application is also a Continuation-In-Part of U.S. application Ser. No. 12/829,961, filed Jul. 2, 2010, which is a Continuation of U.S. application Ser. No. 11/689,247, filed Mar. 21, 2007. U.S. application Ser. No. 11/689,247 claims priority from Provisional Application U.S. Application 60/892,107, filed Feb. 28, 2007 and from Provisional Application U.S. Application 60/895,320, filed Mar. 16, 2007. All of the aforesaid applications are incorporated herein by reference in their entirety as if fully set forth herein.

This application incorporates by reference, in their entirety, but does not claim priority to U.S. Pat. No. 6,374,231, and application Ser. Nos. 09/677,535 filed Oct. 2, 2000, now U.S. Pat. No. 7,752,129; Ser. No. 10/071,053 filed on Feb. 2, 2002, now U.S. Pat. No. 7,519,551; Ser. No. 10/305,439 filed on Oct. 26, 2002, now U.S. Pat. No. 7,680,734; Ser. No. 10/382,946 filed on Mar. 6, 2003, now U.S. Pat. No. 7,536,350; Ser. No. 10/411,650 filed on Apr. 11, 2003, now U.S. Pat. No. 7,509,286; Ser. No. 11/641,046 filed on Dec. 19, 2006.

SUMMARY OF EMBODIMENTS

In one embodiment, a method is disclosed, comprising: (a) maintaining or having maintained or accessing, by one or more computers, an electronic database, on one or more computer readable media, comprising: (i) aggregated deposit account information for one or more of government backed-insured and interest-bearing aggregated deposit accounts, held in one or more depository institutions, comprising at least a first depository institution, each of the one or more aggregated deposit accounts holding funds of more than one client; (ii) client account information for a plurality of client accounts for a plurality of clients whose funds had been accepted for deposit in the names of the respective clients at the first depository institution; (b) obtaining a plurality of net credit/debit amounts during a month period, with each respective net credit/debit amount comprising a sum of credits to and/or debits with respect to multiple of the client accounts for a respective sub-period of the month; (c) generating data for depositing/transferring funds to or withdrawing/transferring funds from at least one of the one or more aggregated deposit accounts multiple times in a month period, based at least in part on one or more of the net credit/debit amounts for one or more sub-periods of time, the data generating step comprising generating data for instructions for making a withdrawal/transfer from funds held at one of the one or more depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within a last six business days of the month period, and presenting instructions to the respective one depository institution using a method that counts against a 6 withdrawal limit for this set of the withdrawals during the last six business days of the month period; and (e) updating or having updated, by the one or more computers, the electronic database to reflect changes in client funds held in the one or more aggregated deposit accounts.

In a further embodiment, the instructions for withdrawal/transfer that count against a 6 withdrawal limit are presented in each of the last 5 business days of the month and are presented by electronic communication.

In a further embodiment, the government backed insurance is Federal Deposit Corporation Insurance.

In a further embodiment, the one or more depository institutions comprises only the first depository institution.

In a further embodiment, the one or more depository institutions comprise a plurality of depository institutions.

In a further embodiment, the one or more depository institutions comprise a plurality of depository institutions, and wherein the generating data for instructions to deposit/transfer funds to or withdraw/transfer funds from the one or more aggregated deposit accounts based at least in part on one or more of the net credit/debit amounts further comprises: transferring funds of a respective client only to one or more depository institutions which hold less than a specified amount of the funds of the respective client account.

In another embodiment, a method is disclosed, comprising: maintaining or having maintained or accessing, by one or more computers, one or more electronic databases, stored on one or more computer-readable media, comprising: (i) aggregated deposit account information for a plurality of respective government-backed insured and interest-bearing aggregated deposit accounts held in a plurality of depository institutions participating in a program, with the aggregated deposit accounts providing non-penalized liquidity for the funds held therein, each of the one or more aggregated deposit accounts holding funds of more than one client; and (ii) client account information for a plurality of client accounts, the client account information for a respective one of the client accounts comprising a balance of client account funds held in each of one or more of the aggregated deposit accounts holding funds of the respective client account; and accessing client account data comprising changes to client account funds sourced to the program from a plurality of source financial entities and held or to be held in the depository institutions in aggregated accounts held therein; allocating, by the one or more computers, fund amounts to the depository institutions to be held in the aggregated deposit accounts therein based at least in part on the client account data for the client account funds and one or more rules; generating data for depositing/transferring funds to or withdrawing/transferring funds from at least one of the aggregated deposit accounts multiple times in a month period, based at least in part on the accessed client account data, the data generating step comprising generating data for instructions for making a withdrawal/transfer from funds held at one of the depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within a last six business days of the month period, and presenting instructions to the respective one depository institution using a method that counts against a 6 withdrawal limit for this set of the withdrawals during the last six business days of the month period; and updating or having updated, by the one or more computers, the one or more electronic databases to reflect changes in client account funds held in the aggregated deposit accounts.

In a further embodiment, the instructions for withdrawal/transfer that count against a 6 withdrawal limit are presented in the last 5 business days of the month and are presented by wire.

In a further embodiment, the method of presentation of the instructions for withdrawal/transfer that counts against the 6 withdrawal limit is by an electronic method.

In a further embodiment, one of the one or more rules for allocation comprises allocating funds of a respective client account only to one or more depository institutions which hold less than a specified amount of the funds of the respective client account.

In a further embodiment, one of the one or more rules for allocation comprises allocating funds to respective depository institutions so as not to exceed a maximum cap for the respective depository institution and/or not to go below a minimum cap for the respective depository institution.

In a further embodiment, one of the one or more rules for allocation comprises allocating funds to a respective one of the depository institutions based, at least in part, whether the one depository institution has sourced funds to the program which are held in one or more other of the depository institutions.

In a further embodiment, one of the one or more rules for allocation comprises allocating funds to a respective one of the depository institutions based, at least in part, on an amount of funds the one depository institution has sourced funds to the program which are held in one or more other of the depository institutions.

In a further embodiment, one of the one or more rules for allocation comprises allocating an amount of funds to a respective one of the depository institutions based, at least in part, on an amount of funds the one depository institution has sourced funds to the program which are held in one or more other of the depository institutions.

In a further embodiment, a step is performed comprising: allocating, using the one or more computers, fund amounts of client accounts among the aggregated deposit accounts, to substantially match the respective fund amounts allocated to the aggregated deposit accounts based at least in part on the client account data for the client account funds and one or more rules.

In a further embodiment, the method steps are performed by a self-clearing broker dealer, and wherein the accessing client account data comprises receiving deposit and/or withdrawal sweep data from one or more other broker dealers, with the deposit and/or withdrawal sweep data comprising deposit and/or withdrawal data for the respective customers holding customer accounts with the one or more broker dealers.

In a further embodiment, the self-clearing broker dealer performs the steps: maintaining the plurality of government backed-insured and interest-bearing aggregated accounts in the depository institutions, with at least one of the aggregated accounts at one of the depository institutions holding funds of multiple of the broker dealers; performing, by the one or more computers, an electronic accounting function on a substantially periodic basis based on client account data associated with the respective broker dealers, wherein the electronic accounting function is performed for the client accounts of the associated broker dealer based on the one or more parameters associated with the respective broker dealer or the respective customer.

In a further embodiment, the one or more accounting parameters comprise a type of rate to be paid one or more client accounts associated with the respective broker dealer.

In a further embodiment, the one or more accounting parameters comprise a tier of a rate chart to be paid on funds of client accounts associated with the broker dealer.

In a further embodiment, the one or more accounting parameters comprise one or more levels of FDIC insurance associated with client accounts associated with the respective broker dealer.

In a further embodiment, the one or more accounting parameters comprise one or more depository institutions that are associated with the client accounts associated with a respective one of the respective broker dealers for holding funds of those client accounts or are prohibited from holding funds of those client accounts.

In a further embodiment, the one or more accounting parameters comprise one or more of the depository institutions that are associated with only a subset of the broker dealers for holding funds of only the subset of the broker dealers or are prohibited from holding funds of the subset of the broker dealers.

In a further embodiment, the one or more accounting parameters comprise a preferred method for customer initiated/late day transactions.

In a further embodiment, a step is performed of replacing at least a portion of money withdrawn of one of the broker dealers from one of the depository institutions by depositing money from another of the broker dealers into the one depository institution.

In a further embodiment, the self clearing broker dealer maintains an accounting electronic database, on one or more computers, containing information on one or more accounting parameters to be applied when performing accounting functions relating to funds of a plurality of the client accounts of a plurality of the broker dealers.

In a yet further embodiment, a method is disclosed, comprising: maintaining or having maintained or accessing, by one or more computers, one or more electronic databases, stored on one or more computer-readable media, comprising: (i) aggregated deposit account information for a plurality of respective government-backed insured and interest-bearing aggregated deposit accounts held in a plurality of depository institutions participating in a program, with the aggregated deposit accounts providing non-penalized liquidity for the funds held therein, each of the one or more aggregated deposit accounts holding funds of more than one client; and (ii) client account information for a plurality of client accounts, the client account information for a respective one of the client accounts comprising a balance of client account funds held in each of one or more of the aggregated deposit accounts holding funds of the respective client account; and accessing client account data comprising changes to client account funds sourced to the program from a plurality of source financial entities and held or to be held in the depository institutions in aggregated accounts held therein; allocating, by the one or more computers, fund amounts to the depository institutions to be held in the aggregated deposit accounts therein based at least in part on the client account data for the client account funds and one or more rules; generating data for depositing/transferring funds to or withdrawing/transferring funds from at least one of the aggregated deposit accounts multiple times in a month period, based at least in part on the accessed client account data, the data generating step comprising generating data for instructions for making a withdrawal/transfer from funds held at one of the depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within the month period, and presenting instructions to the respective one depository institution using a method that counts against a 6 withdrawal limit for this set of the withdrawals during the month period; and updating or having updated, by the one or more computers, the one or more electronic databases to reflect changes in client account funds held in the aggregated deposit accounts.

DETAILED DESCRIPTION OF THE EMBODIMENTS

Figure 1:
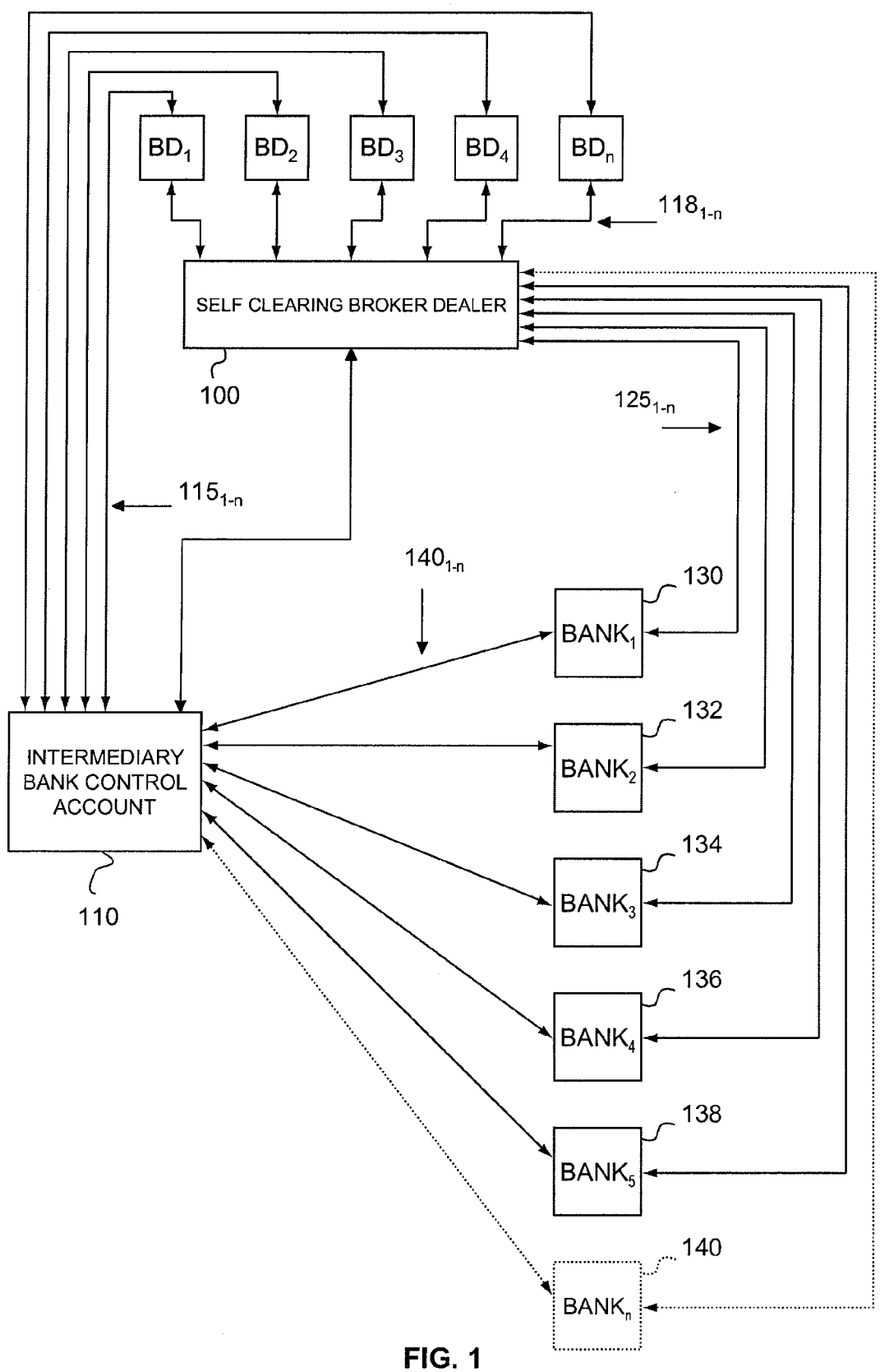
FIG. 1 is schematic block diagram of one embodiment.

The following terms used in this application are intended to have the meaning as described herein:

"aggregated account" comprises an account at a depository institution for holding funds for a plurality of clients from one or more financial entities. The aggregated account may be a segregated account that only holds the funds for a plurality of clients of a single financial entity that may or may not be self-clearing. Alternatively, the aggregated account may hold the assets for a plurality of clients of a plurality of financial entities which may utilize the clearing services provided by a self-clearing financial entity or a management institution, depending upon the program.

"broker dealer" is intended to take its ordinarily understood meaning in the art to cover entities offering programs such as brokerage advisors, investment advisors, broker dealers, management institutions and the like. A broker dealer may maintain one or more customer accounts on behalf of one or more customers for receiving funds deposited thereto, and for debiting checks or other financial instruments drawn against that account.

"self clearing broker dealer" is intended to take its ordinarily understood meaning in the art to cover broker dealers that perform clearing services for other broker dealers and/or for their own customers. Such clearing services could comprise ensuring the cash deposits from the other broker dealers were deposited in one or more program banks, performing accounting functions with respect to these incoming and outgoing funds, and performing or having performed reconciliation processing to determine for each of a plurality of customers, that a balance in a customer account after deposit and/or withdrawal transactions equals the amount associated with the respective customer in one or more of the program banks. Note that a self clearing broker dealer may only be a self clearing broker dealer (provide clearing services) for some transactions, and not for others. For example, a broker dealer could be a self clearing broker dealer only for cash, and not for equities transactions, or could be responsible for all or a subset of clearing functions except cash for his customers that participate in an insured deposits program, and could be for all customer accounts or a select group of accounts.

"holdback bank" is a bank that has agreed to a temporary withdrawal of funds from its account which may be later used to settle late day customer service and fee transactions, for example, cards/checks/ACH/fees, to name a few, that may be available for processing after the daily bank settlement deadline, typically 4:00 pm. The holdback withdrawal may be factored into the first runs and/or later runs of the bank allocation process on the sweep files, e.g., subtracted from credits to reduce the deposits to be allocated or added to debits to increase the dollar amount withdrawn from the holdback bank.

"program" is a deposit arrangement to obtain FDIC insurance for account balances over the FDIC insurance limit for a single account through the use of a plurality of aggregated accounts, with aggregated accounts in different program banks.

"program bank" is any bank, savings institution or other financial entity that holds an aggregated account in the program and that has government backed insurance.

"depository institution" means any institution which is authorized to accept deposits and issue certificates of deposit. This would include state and national banks, state and federal savings banks, savings and loan associations, credit unions, and probably some industrial loan companies, depending on current law. Most but not necessarily all, would have government backed-insurance, such as Federal Deposit Insurance Corporation (FDIC) insurance, or the National Credit Union Share Insurance Fund (NCUSIF) for credit unions, or state insurance.

"client account" refers to client funds, such as, for example, consisting of funds of the client designated or determined for management by the deposit management system, to be described.

In some deposit systems, one entity may play the role of one or more of the above. For example, a source financial entity, such as a bank, may also be a depository institution. Similarly, a source financial entity, like a broker-dealer, or a bank, may be affiliated with one or more of the depository institutions.

An administrator for program may be a source financial entity, a depository institution, a clearance bank, and/or another entity participating in deposit sweep functions or another managing entity. Likewise, a particular program may have one source financial entity or many source financial entities. Similarly, a particular program may have one depository institution or many depository institutions.

Figure 4:
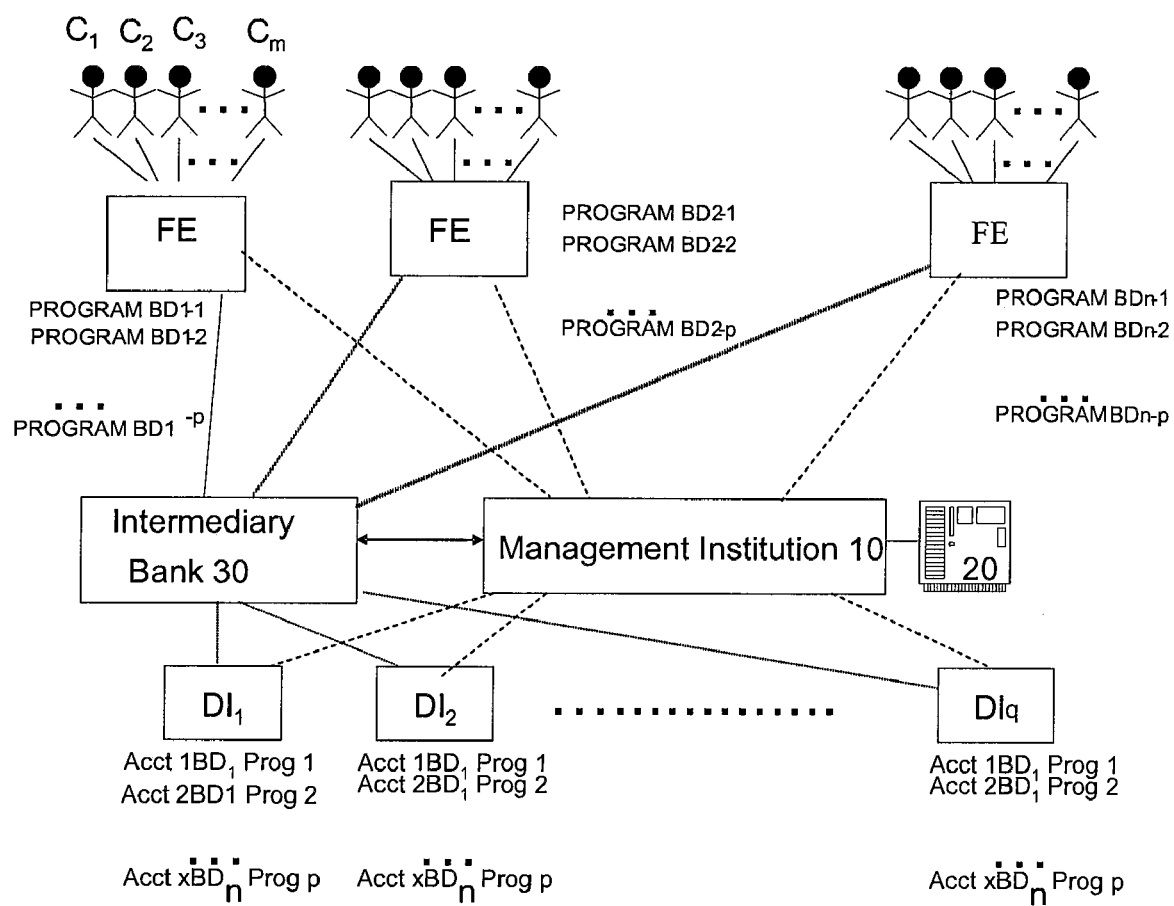
FIG. 4 is a schematic block diagram of a further embodiment.
Figure 5:
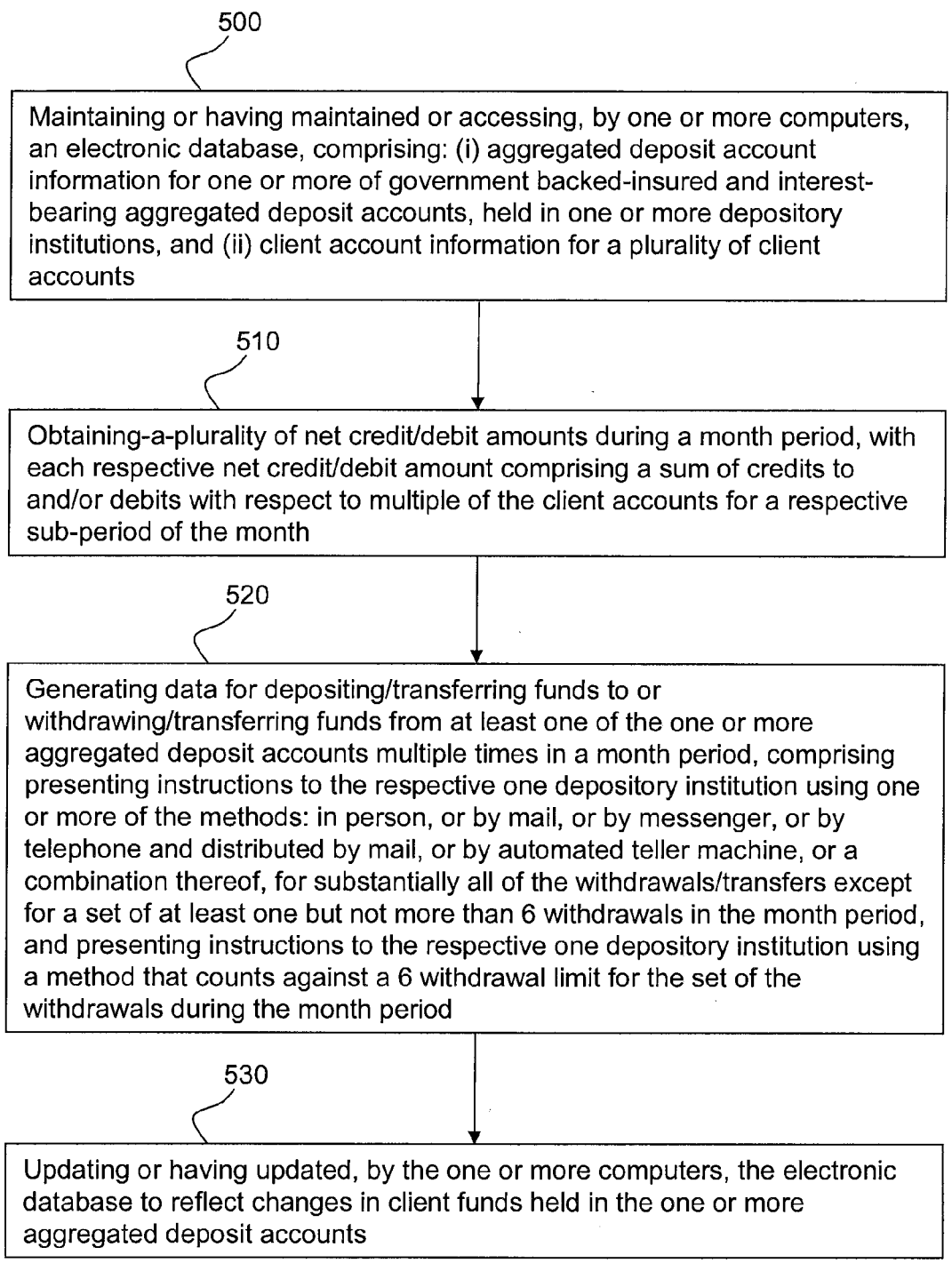
FIG. 5 is a schematic block diagram of a flowchart of operations for a further embodiment.
Figure 6:
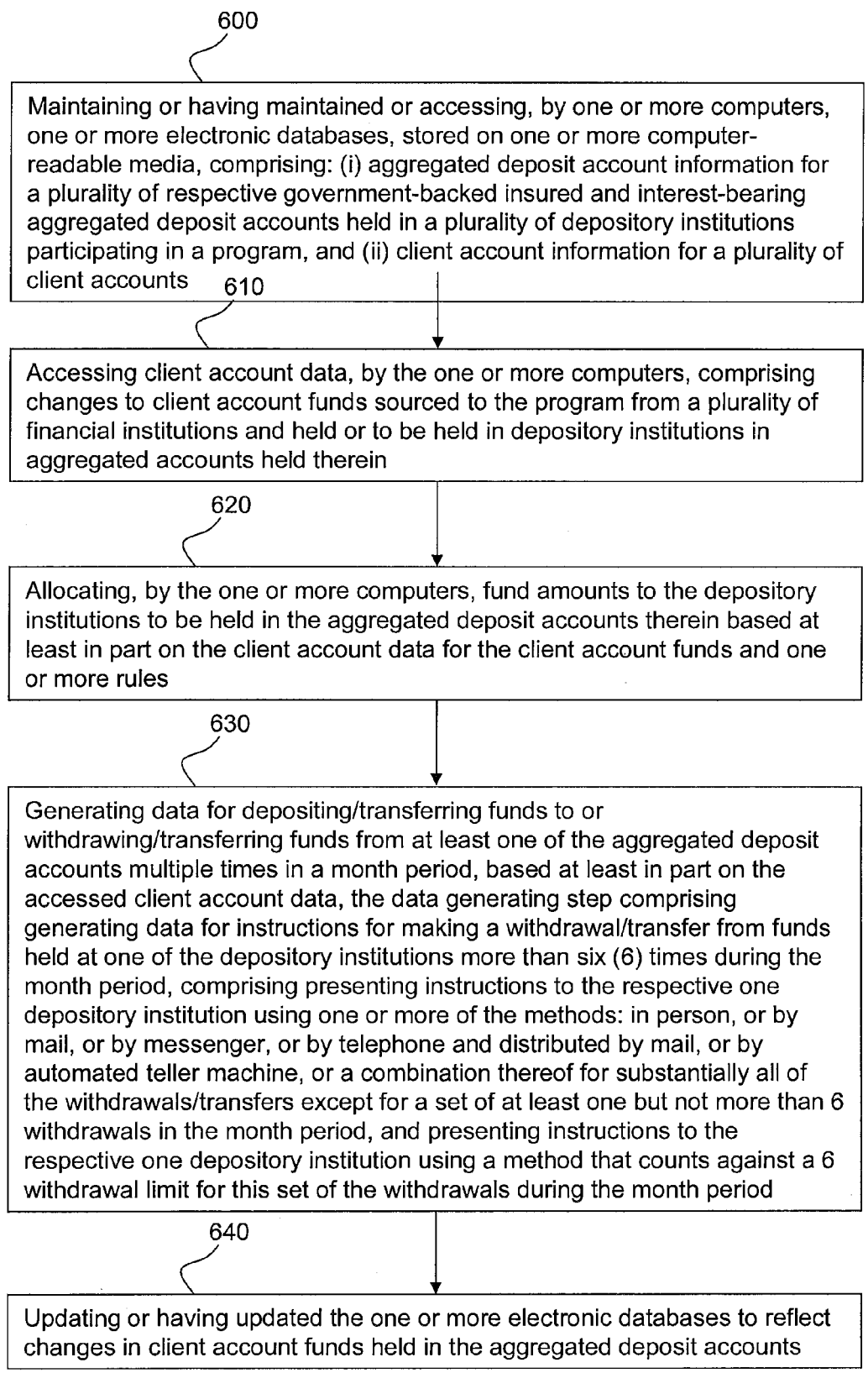
FIG. 6 is a schematic block diagram of a flowchart of operations for a further embodiment.

FIGS. 4, 5 and 6 illustrate embodiments with reference to the inventions described in application Ser. No. 10/071,053, now U.S. Pat. No. 7,519,551, and Ser. No. 10/382,946, now U.S. Pat. No. 7,536,350, that are incorporated by reference into this application. These embodiments are not limited to self clearing broker dealer operations, but use any type of source institution and may be performed by a variety of different entities.

In one embodiment, to a system and method is described for managing deposits and withdrawals from among a plurality of aggregated accounts held at a plurality of depository institutions in order to obtain government backed insurance above the limit set for individual accounts. In a further embodiment, the invention relates to a system and method for managing the transfer of client funds received from one or more financial entities by controlling the deposits to and withdrawals from among a plurality of aggregated accounts held at a plurality of depository institutions in order to obtain certain results. In one embodiment, the deposits and withdrawals are managed to strive to obtain balances in one or more aggregated accounts in one or more destination depository institutions associated with a financial entity(s) or program that are above the respective minimum caps for the respective deposit accounts at the different respective depository institutions. In a further embodiment, the deposits and withdrawals are managed to strive to obtain balances in one or more aggregated accounts held in one or more destination depository institutions associated with a financial entity(s) or program that fall between respective min and max caps for each respective aggregated account at the respective depository institutions. In yet a further embodiment, the deposits and withdrawals are managed to strive to obtain balances in a plurality of aggregated accounts associated with different programs but in the same depository institution, but managed by the same management institution, above a minimum cap associated with the depository institution. In a further embodiment, the deposits and withdrawals are managed to strive to obtain balances, that once reached in one or more aggregated account, are held stable with limited or no account activity.

In yet a further embodiment, the deposits and withdrawals from the deposit accounts are managed to ensure that no more than a predetermined amount, such as for example, $250,000, associated with a given client is held in any one depository institution. In a further embodiment, the deposits to and withdrawals from the aggregated accounts are managed to obtain a hold back amount to be used to cover late transactions after the closing time. In yet a further embodiment, a reconciliation process ensures that client balances reflected in the records maintained by financial entities for their participating clients are equal to the client balances reflected in a management institution's records for those same participating clients, and that aggregate balances maintained in aggregated accounts at respective depository institutions are in balance with an aggregate balance of the individual client balances reflected in the management institution records and the financial entity records. On a daily basis or other periodic basis, this reconciliation process in one embodiment includes comparing the aggregate balances for clients maintained by the management institution to the position maintained at the financial entity for each of its clients, comparing the aggregate balance at each depository institution maintained by the management institution to the actual aggregate balance at each depository institution, and in addition a control operating account in an intermediate bank used for facilitating fund transfers is reconciled to ensure the correct money movements as specified by the various depository institution allocations has taken place. In yet a further embodiment, the minimum and/or maximum caps are varied to manage the amount of net assets in an affiliated depository institution.

FIG. 4 is a block diagram, taken from Ser. No. 11/689,247 filed Mar. 21, 2007 that is incorporated by reference herein, of a system for allocating deposits to and withdrawals from aggregated accounts, generally designated by reference number 1, according to an exemplary embodiment of the present invention. The system 1 includes a number of financial entities FE1-FEn, each managing one or more programs, such as insured deposit products, for example. Each program may include one or more insured deposit products, each having different attributes, such as insurance level, different tier options and rates paid and services. In one embodiment, the rates paid may be determined by such factors as the balance in the client's insured account, or can be determined by the total value of the client's brokerage account, or determined by the total value of a group of accounts for a particular household together, or determined by relationship pricing based on the number of products a client uses though a financial entity or sister entities, to name a few. Each financial entity FE1-FEn may have a plurality of clients C1-Cm that invest in particular products that make up part of a particular program. The clients C1-Cm may be individuals or corporations or any other form of entity. Thus, for example, a financial entity FE1 may manage a number of programs designated in FIG. 1 as PROGRAM FE1-1, PROGRAM FE1-2, . . . PROGRAM FE1-$p$, where each client C1-Cm of the financial entity FE1 invests in at least one of the products under at least one of the programs PROGRAM FE1-1-PROGRAM FE1-$p$. Examples of different kinds of programs that may be offered, include a program with cash management services, a program for high net worth individuals with a higher minimum balance required, a program paying a lower rate and offering more services, a no frills program with a higher rate and no services, however for a fee the client could get other services, to name a few.

The system 1 also includes a number of depository institutions DI1-DIq, into which funds are deposited. Depository institutions DI1-DIq may be, for example, banks or credit unions, or other types of depository institutions. Preferably, at least some of depository institutions DI1-DIq are government backed insured, e.g., insurance from the Federal Deposit Insurance Corporation (FDIC). However, not all depository institutions need be government backed insured. For example, certain programs can also default to a money fund, or other uninsured deposit account, if the client's account balance is over the government backed insurance limit for that program. While the basic federal insurance amount is currently $250,000, more than $250,000 of coverage can be obtained if funds are maintained in different ownership categories, according to the FDIC. For example, coverage of up to $250,000 can be obtained for individual accounts at a depository institution, another $250,000 for each share of joint accounts at the same depository institution, and yet additional insurance for retirement accounts held at the same depository institution. Moreover, by depositing funds at more than one government backed insured depository institution, multiples of $250,000 of coverage can become protected by federal insurance. For example, if deposits are made to 10 government backed insured depository institutions, with no more than $250,000 for each ownership category deposited in each of said 10 government backed depository institutions, then $2,500,000 of effective federal insurance can be obtained for each ownership category.

In a variety of embodiments, direct deposits to and direct withdrawals from aggregated deposit accounts are performed. However, in one embodiment, a financial entity, or a management institution 10, acting as agent for the financial entity (to be discussed later) manages in each depository institution (e.g., bank or saving institution) an aggregate money market deposit account (MMDA) and an aggregate demand deposit account (DDA), both being in the identical name of financial entity, or its agent (referred to herein as an "MMDA-DDA pair") or the like. In response to deposit and withdrawal transactions by or on behalf of clients, the financial entity or its agent initiates transfers of funds between the MMDA-DDA pairs, so that if the aggregate deposits of all clients for that financial entity or program exceed the aggregate client withdrawals (net client credit), then all or some of the funds may be deposited directly in the MMDA at the depository institution or, in an alternative embodiment, by way of the DDA in the MMDA-DDA pair. Conversely, if client withdrawals for all clients of that financial entity or Program exceed client deposits (net client debit), then the depository institution may be instructed by messenger or otherwise to transfer funds from the aggregate MMDA to the DDA.

As noted, the MMDAs are interest-bearing, insured deposit accounts, collectively in which the managed balances for clients are deposited. The DDAs, which are deposit accounts permitting an unlimited number of deposits and withdrawals, serve to facilitate the exchange of funds between the MMDAs, the depository institutions, and sources of client transactions (referred to herein as "transaction sources"). If the financial entity or the management institution 10 determines that it is necessary to move funds from a particular MMDA (at a particular depository institution), it first causes a messenger or otherwise to have these funds transferred from the MMDA to the DDA member of the MMDA-DDA pair, and second, causes the funds in the DDA to be moved to the financial entity's or its agent's own account or accounts. Then, from these accounts, funds may be further transferred to a third party, such as a transaction source or a customer financial entity (preferably by electronic or other automatic means). If funds are to be moved into a particular MMDA, the agent either may have them deposited into the associated DDA and then moved into the MMDA, or may have them deposited directly into the MMDA. The agent database is updated to reflect these funds transfers.

While in a preferred embodiment, a separate account or set of accounts, e.g., money market deposit accounts (MMDA), demand deposit account (DDA), are set up for each program for each financial entity, under certain embodiments of the present invention different programs of the same financial entity or different financial entities can be commingled and aggregated. Note that a financial entity does not have to set up a separate money market deposit account (MMDA) and associated demand deposit account (DDA) for each program at the depository institution, i.e., the same MMDA and/or DDA can be used across several programs if registered, e.g., in the name of and offered by the same self clearing financial entity or the like. Similarly, a single MMDA or other type of account can be set up at each depository institution, or more than two aggregated accounts can be set up at each depository institution. If a financial entity is a clearing firm that provides clearing services for other financial entities (correspondents), it is not necessary for the correspondents to set up a segregated MMDA and DDA for their respective programs. Note that it is not necessary for each financial entity, whether a bank or other entity, to set up segregated aggregated accounts at the depository institution. Rather a management institution 10 could act as an agent for a group of such financial entities so that assets for several financial entity banks or other entities can be held in the same MMDA and DDA registered in the name of the management institution at each depository institution DI1-Diq or the like. But if the same program is being offered by different financial entities, separate accounts are used for each financial entity that is a self clearing financial entity. Note that a self clearing financial entity is defined as a financial entity that provides clearing services for his clients only and/or provides clearing services for other financial entities that are not self clearing but correspondents of the self clearing financial entity. The deposits for the clients of the correspondent financial entities would be held in the self clearing financial entity's MMDA that is held in a depository institution associated with that self clearing financial entity. Thus, for example, if depository institution DI1 participates in three programs each run by a different self clearing financial entity, the depository institution DI1 may have three segregated aggregated accounts, each aggregated account associated with a different self clearing financial entity. The segregated aggregated accounts are preferably money market deposit accounts (MMDAs) registered in the name of the financial entity that manages the program associated with the MMDA or the like. However, any other suitable investment accounts may be used, such as NOW accounts for individuals, or DDA's. Moreover, more than one type of account could be used, e.g., an aggregated MMDA and an aggregated DDA at each depository institution. In some embodiments as noted above, a management institution 10 may be provided within the system 1 that could maintain account information for each of the financial entities (FE1, FE2, . . . FEn) and others in a database within its own system or have such a database maintained for its use.

In embodiments comprising a management institution, the management institution 10 is configured to allocate and manage deposits, withdrawals and other transactions relating to each of the accounts in each of the depository institutions DI1-DIq. Thus, the management institution tracks the net activity for the aggregated accounts maintained by the financial entity or the management institution 10 itself at the depository institutions DI1-DIq based on information sent from the financial entities FE1-FEn to the management institution 10 and/or from other appropriate sources via contract or otherwise. The management institution 10 maintains records or has maintained for it records on each financial entity and their respective clients with funds in depository institutions managed by the management institution 10, whether the financial entity is self clearing or not. Thus, in one embodiment, the management institution 10 maintains account records for all of the client accounts associated with the financial entities with funds managed by the management institution 10. As explained more fully below, the management institution 10 may automatically generate reports, for example in the form of e-mail messages, text messages, faxes, etc., advising the financial entities FE1-FEn of the day's net activity for a specific account in a specific depository institution DIq holding funds for that financial entity, and/or activity in one or more client accounts of that financial entity. If more than one account is maintained at a depository institution DI1-DIq, each account may be settled separately. The management institution 10 maintains or has maintained for it computer software and/or hardware 20 located at the management institution site, or at a remote site that is in communication with the management institution 10, that maintains databases and other program functions to track the activities in the various aggregated accounts in each depository institution DI1-DIq. Examples of such computer software and/or hardware will be discussed below.

An intermediary bank 30 may be incorporated as part of the system 1 to oversee and facilitate the transactions to and from the various aggregated accounts based on management institution 10 allocations. The intermediary bank 30 may either be the same as or separate from the management institution 10. In embodiments where the management institution 10 and the intermediary bank 30 are separate entities, they may be in substantially constant electronic communication. The intermediary bank 30 includes one or more control operating accounts, for example, one control operating account per self clearing financial entity. In one embodiment, the management institution 10 also maintains records of deposits, debits and balances for each client of a financial entity with funds in a control operating account, whether or not that financial entity is a self clearing financial entity. At the end of a period of time, such as 2-4 hours, or a day, for example, the balance of funds in each of the control operating accounts at the intermediary bank 30 are transferred to or from one or more of the depository institutions DI1-DIq. Note that in some embodiments where the self clearing FI's are not banks, self clearing financial entities use the intermediary bank to execute the wires, i.e., to send and receive wires/funds from the depository institutions.

According to various exemplary embodiments of the method of the present invention, each depository institution DI1-DIq may be assigned a minimum deposit cap (Min Cap), a maximum deposit cap (Max Cap), and an absolute cap (Absolute Cap). These caps are used to determine which depository institutions to select in an allocation process for a sweep file net deposit or withdrawal, to be discussed below. These caps may remain the same or be reset as appropriate.

"Min Cap" is the minimum deposit amount to be maintained either in a given aggregated account at a destination depository institution, or the minimum deposit amount to be maintained over a plurality of aggregated accounts at a destination depository institution. In one embodiment, the minimum cap may be negotiated for an individual aggregate account at a depository institution. If there is only one aggregated account at the depository institution, then this minimum pertains/is associated with the overall depository institution. In another embodiment, a management institution may manage a plurality of different programs for its customer financial entities, with each different program having a plurality of destination depository institutions for depositing funds thereamong for that program or financial entity, wherein there may be an overlap in the destination depository institutions of the programs. The management institution may then negotiate a minimum cap for the depository institution and split the minimum in its discretion between or among different aggregated accounts associated with the different programs at the same depository institution, and may alter that split on a real time basis in its discretion. The minimum deposit cap can be set to zero or greater. Accordingly, when allocating deposits to the depository institutions for a given financial entity and/or program, the allocation process will attempt to satisfy the minimum deposit cap associated with the aggregated account for that financial entity and/or program at the destination depository institution. In an embodiment, the allocation process may allocate withdrawal of funds first from aggregated accounts held in destination depository institutions for that financial entity and/or program that have balances above their respective minimum deposit caps before it allocates withdrawal of funds from aggregated accounts held in destination depository institutions for that financial entity and/or program that are at or below their respective minimum deposit caps. Note that the Min Cap can be set using a variety of factors. As noted, the Min Cap at a depository institution may be associated with a single aggregated account of a financial entity and/or program. Thus, there may be a different respective Min Cap associated with each different financial entity with an aggregated account registered at that depository institution. In an alternative embodiment, as noted above, the Min Cap may be negotiated with a management institution 10 and may cover the aggregate of all of the funds managed by that management institution in aggregated accounts in that depository institution. Thus, the management institution would attempt to ensure that a certain stable minimum amount of total assets managed by the management institution were maintained at that depository institution "Max Cap" is the maximum deposit amount that is to be maintained either in a given aggregated account at a destination depository institution, or the maximum deposit amount to be maintained over a plurality of aggregated accounts, each associated with a different financial entity and/or program, at a destination depository institution. The system will allocate deposits to respective aggregated accounts held in destination depository institutions associated with the given financial entity and/or program that are below their respective Max Caps in an order that is set by rule for deposits. As with the Min Cap, the Max Cap may be one associated with a single aggregated account of a single financial entity. Alternatively, the Max Cap may be the aggregate dollar amount the management institution 10 has approved for the particular depository institution to be split among a plurality of the aggregated accounts at that depository institution, or a lesser amount set by that depository institution for all of the accounts managed by the management institution 10. In one embodiment, the Max Cap is set based on a credit policy. In this embodiment, before a depository institution is added to the deposit system of the present invention, the management institution 10 performs a credit check and determines if the depository institution meets predetermined credit standards required by the financial entity associated with that aggregated account, or alternatively required by a management institution credit policy. The management institution 10 then approves each depository institution for a specific aggregate deposit amount that is either associated with a given aggregated account at the depository institution, or with the overall depository institution. This amount may be changed over time as circumstances require. The Max Cap thus functions in this embodiment as a safety cap to ensure that the system does not allocate a deposit to an aggregated account at the depository institution that will push it over the Max Cap. As noted above, at times the depository institution will request a lower deposit max cap.

"Absolute Cap" is the maximum deposit amount approved for either the aggregated account held in a destination depository institution or for the depository institution itself. The absolute cap can be greater than or equal to the Max Cap. In situations where some or all of the aggregated accounts are at or over their respective Max Caps, the system may allocate deposits to aggregated accounts or to depository institutions above their respective Max Caps up to an Absolute Cap that should not be exceeded.

"Min=Max" if the min and max cap are equal, the aggregated account held in the destination depository institution is preferably bypassed by the allocation process once deposits from a given financial entity and/or program reach the level of the Min=Max Cap. It is intended that such aggregated account held in the depository institution, after its balance of assets is at or above it Min Cap, shall have virtually no activity, other than the posting of interest at month end. The allocation process is designed to access the funds in these depository institutions only if there is no other option. The allocation process automatically allows for minimal increases in the Max Caps at month end to allow for interest posting. Note that other methods of preventing transfers to or from an aggregated account or a depository institution are further described later.

The management institution 10 may be designed to run two allocation processes: a depository institution allocation process, which allocates funds between/among the depository institutions DI1-DIq, and a client account balance allocation (to be discussed later). Referring to the depository institution allocation process, as explained in further detail below, this allocation process may serve one or more of several purposes, such as, for example, to maintain substantially stable deposit funds at a depository institution by a financial entity or a management institution by limiting deposit/withdrawal activity, to ensure that activity at the depository institutions DI1-DIq complies with federal regulations such as FDIC regulations, to ensure compliance with a credit policy, and to insure compliance with specific rules set by the client, the Financial entity, or the branch, to name a few.

With reference to the Min=Max cap parameter, the inventors have recognized that depository institutions are more willing to accept large deposits if the management institution can guarantee substantial stability, with limited activity. If the account has substantial activity it becomes a burden to the depository institution. Minimization of deposit and withdrawal activity also makes reconciliation easier for the given financial entity maintaining funds in that depository institution, since it may be less costly if the financial entity and/or the management institution 10 is not sending wires every day to every depository institution. Additionally, deposit/withdrawal minimization reduces the people resources needed to administer the various program.

In one embodiment, the depository institution allocation process through the use of the Min Cap, may try to bring the balance in each aggregated account at the depository institutions up to at least a minimum deposit cap. This minimum deposit cap may be negotiated based on a variety of business and banking concerns such as a minimum level of stable assets maintained by a financial entity or program or the management institution at the depository institution, or the depository institutions overall need for deposits to cover loan activity, and minimization of deposit/withdrawal activity, as discussed above.

As noted above, a maximum deposit cap, Max Cap, may also be set for the particular depository institution for various reasons including maintaining a credit policy, and controlling a level of activity in a transaction account.

The depository institution allocation process may be set to minimize activity for that aggregated account after the balance in the account has reached the Min Cap, via by-passing withdrawals or credits to that depository institution account by setting the minimum deposit cap equal to the maximum deposit cap. Alternatively, other methods of flagging accounts that should remain unchanged as a result of net daily activity can be used as the equivalent of setting the maximum deposit and the minimum deposit to be equal. For example, a flagging method may comprise determining if a flag such as a data field has been set in the system or a database indicates whether to avoid withdrawing funds from or depositing funds to the different one of the aggregated accounts, or if a rule is currently in operation to avoid withdrawing funds from or depositing funds to the different one of the aggregated accounts. In one embodiment, this data field or rule may be associated with a given day, set of days, week, etc., and may indicate that no withdrawals are to take place for the designated periods. Alternatively, such a flag or rule may indicate that no deposit or withdrawal activity is to take place with respect to the particular aggregated account. Note that in one embodiment, deposit and/or withdrawal activity may be directed to or away from a given aggregated account using minimum caps, maximum caps, flags, rules, and various combinations thereof.

In some instances, the allocation process may not be able to by-pass a particular depository institution for withdrawals, such as when a by-pass is in conflict with set parameters or a client has a withdrawal that is only attached to the particular depository institution. In this case, the depository institution allocation process will allow the withdrawal but attempt to replace the dollar amount withdrawn with an offsetting credit from one or more other clients of that financial entity with funds in an aggregated account at a different depository institution associated with that financial entity, and/or in some instances simply with funds from another depository institution managed by the management institution 10. Accordingly, the process reallocates funds from one or more aggregated accounts attached to other depository institutions. Thus, the net activity for the depository institution in which the withdrawal should have been by-passed is at or about zero.

The second allocation process is the client account balance allocation. In this allocation, the client account balances are reshuffled/reallocated at some convenient time, to match the allocation to each depository institution determined above. Thus, individual client balances for clients of a given financial entity FE1 or its correspondents can be shuffled/allocated to aggregated accounts in different depository institutions. In one embodiment, the management institution 10 reshuffles by following individual client account business rules, and financial entity and correspondent and branch business rules (examples will provided below), and then the remaining client accounts are reshuffled/allocated beginning with the client account of the financial entity or correspondent (in the case of co-mingled accounts) with the highest balance and progressing to the client account with the lowest balance. The reallocation alternatively can be performed from the lowest account balance to the highest account balance, or in any other convenient sequence. In the example, the depository institution DI1 with its aggregated account having its Min Cap=and Max Cap would not be debited for the $50,000 client withdrawal. Rather, the client account balances would be reshuffled among depository institutions to allocate sufficient balances from other depository institutions associated with financial entity FE1 either directly or through a correspondent relationship to ensure that the aggregate amount on deposit remains unchanged at the depository institution DI1.

The transferring of funds from the financial entity to one or more depository institutions may be performed, in one embodiment, by way of an intermediary bank 30 which may or may not be associated with the management institution 10. This movement/distribution of the funds may be accomplished before or after the reshuffling of client account balances process. In one embodiment, a deposit of the funds to the depository institutions may be accomplished by sending, by any convenient mode of communication, e.g., wire, email, telephone, mail, etc., an order to the intermediary bank 30 to transfer funds to selected destination depository institutions DI associated with the financial entity and/or program in the amounts prescribed. For debits, in one embodiment, a wire or other convenient mode of communication may be sent by the management institution 10 or a self clearing financial entity depending on whether or not the accounts are segregated, to a messenger service to have a messenger deliver a transfer form sent to the depository institution to cause it to withdraw funds. In this manner, a debit of funds is made from selected depository institutions associated with financial entity in amounts prescribed. Other known or future developed techniques for delivering funds may also be used.

In an embodiment of the invention, the allocation process may also be used to ensure that the depository institutions DI1-DIq comply with FDIC regulations. For example, federal regulations currently prohibit more than six withdrawals from interest bearing demand accounts during a monthly period using certain withdrawal techniques.

Referring to FIG. 5, block 500 represents an operation of maintaining or having maintained or accessing, by one or more computers, an electronic database, on one or more computer readable media, comprising: (i) aggregated deposit account information for one or more of government backed-insured and interest-bearing aggregated deposit accounts, held in one or more depository institutions, comprising at least a first depository institution, each of the one or more aggregated deposit accounts holding funds of more than one client; and (ii) client account information for a plurality of client accounts for a plurality of clients whose funds had been accepted for deposit in the names of the respective clients at the first depository institution. Note that in one embodiment, the government backed insurance is from the Federal Deposit Insurance Corporation.

Block 510 represents an operation of obtaining a plurality of net credit/debit amounts during a month period, with each respective net credit/debit amount comprising a sum of credits to and/or debits with respect to multiple of the client accounts for a respective sub-period of the month. This element may be performed by receiving or accessing data for net credit/debit amounts comprising a sum of credits to and/or debits from multiple of the client accounts. Alternatively, this element may be performed by obtaining deposit and/or withdrawal sweeps, or individual item data or net data for individual client accounts, and then calculating a net credit/debit amount. Data may be received or accessed electronically, or may be received by telephone, or by facsimile, and then keyed into the one or more databases of the system. The method by which this data is obtained is not limiting on the invention.

Block 520 represents an operation of generating data for depositing/transferring funds to or withdrawing/transferring funds from at least one of the one or more aggregated deposit accounts multiple times in a month period, based at least in part on one or more of the net credit/debit amounts for one or more sub-periods of time. The data generating step comprises generating data for instructions for making a withdrawal/transfer from funds held at one of the one or more depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within the month period, and presenting instructions to the respective one depository institution using a method that counts against a 6 withdrawal limit for this set of the withdrawals during the month period. In one embodiment, the set of at least one but not more than six withdrawals within the month period is from the last six business days of the month period, and instructions are presented to the respective one depository institution using a method that counts against a 6 withdrawal limit for this set of the withdrawals during the last six business days of the month period. In one embodiment, the instructions for withdrawal/transfer that count against a 6 withdrawal limit are presented in the last 5 business days of the month and are presented by electronic communication. In another embodiment, the presentation of the instructions is made using a method that counts against the 6 withdrawal limit only on a selected day of the week, e.g., only on Mondays, or only on Fridays. In another embodiment, the presentation of the instructions is made using a method that counts against the 6 withdrawal limit only in a selected week of the month, e.g., the first week of the month. In another embodiment, the presentation of the instructions made using a method that counts against the 6 withdrawal limit is intermingled during the month. In one embodiment, the presentation of the instruction that counts against the 6 withdrawal limit is by wire. As noted, the 6 withdrawal limit referenced is set by U.S. federal banking regulation.

Block 530 represents an operation of updating or having updated, by the one or more computers, the electronic database to reflect changes in client funds held in the one or more aggregated deposit accounts.

In one embodiment, the one or more depository institutions holding one or more aggregated deposit accounts comprises only the first depository institution. This embodiment allows a depository institution to maintain funds of its customers on its balance sheet, provide government backed insurance, and permit unlimited number of withdrawals in a month. In a further embodiment, the one or more depository institutions comprise a plurality of depository institutions.

In a further embodiment, the one or more depository institutions comprise a plurality of depository institutions, and the generating data for instructions to deposit/transfer funds to or withdraw/transfer funds from the one or more aggregated deposit accounts based at least in part on one or more of the net credit/debit amounts further comprises the operation of transferring funds of a respective client only to one or more depository institutions which hold less than a specified amount of the funds of the respective client. For example, the specified amount may be equal to or less than an FDIC insurance limit for an individual account.

As noted, these embodiments may be implemented with a variety of different source institutions. However, in one embodiment, there are a plurality of depository institutions holding aggregated deposit accounts, and the method steps are performed by a self-clearing broker dealer, and wherein the accessing client account data comprises receiving deposit and/or withdrawal sweep data from one or more other broker dealers, with the deposit and/or withdrawal sweep data comprising deposit and/or withdrawal data for the respective clients having client accounts with the one or more broker dealers.

As noted, these embodiments may be implemented with a variety of different source institutions. However, in one embodiment, a self-clearing broker dealer may perform the steps of maintaining the plurality of government backed-insured and interest-bearing aggregated accounts in the plurality of depository institutions. In at least one embodiment, at least one of the aggregated accounts at one of the depository institutions holds funds of multiple of the broker dealers. The self-clearing broker dealer may also perform, by the one or more computers, an electronic accounting function on a substantially periodic basis based on client account data associated with the respective broker dealers, wherein the electronic accounting function is performed for the client accounts of the associated broker dealer based on the one or more parameters associated with the respective broker dealer or the respective customer. Examples of such parameters have been previously described.

Referring to FIG. 6, an implementation of a further embodiment of the invention is disclosed. Block 600 comprises an operation of maintaining or having maintained or accessing, by one or more computers, one or more electronic databases, stored on one or more computer-readable media, comprising: (i) aggregated deposit account information for a plurality of respective government-backed insured and interest-bearing aggregated deposit accounts held in a plurality of depository institutions participating in a program, with the aggregated deposit accounts providing non-penalized liquidity for the funds held therein, each of the one or more aggregated deposit accounts holding funds of more than one client; and (ii) client account information for a plurality of client accounts, the client account information for a respective one of the client accounts comprising a balance of client account funds held in each of one or more of the aggregated deposit accounts holding funds of the respective client account.

Block 610 comprises an operation of accessing client account data comprising changes to client account funds sourced to the program from a plurality of source financial entities and held or to be held in the depository institutions in aggregated accounts held therein. In one embodiment, this data may comprise sweep data, and/or data for individual transactions or nets thereof, from source financial entities such as banks, credit unions, other types of depository institutions, registered investment advisors, broker dealers, asset managers, trust companies, retirement programs, other financial entities or intermediaries, to name a few.

The accessing operation may be performed by receiving or accessing data for net credit/debit amounts comprising a sum of credits to and/or debits from multiple of the client accounts. Alternatively, this element may be performed by obtaining deposit and/or withdrawal sweeps, and/or individual item data or net data for individual client accounts, and then calculating a net credit/debit amount. Data may be received or accessed electronically, or by telephone, or by facsimile, and then keyed into the one or more databases of the system. The method by which this data is obtained is not limiting on the invention.

One or more intermediary institutions may be used to facilitate the movement of funds between the one or more source financial entities and the depository institution(s) and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that multiple entities may also fulfill a single function or roll.

As noted above, in some deposit systems, one entity may play the role of one or more of the above. For example, a source financial entity, such as a bank, may also be a depository institution. Similarly, a source financial entity, like a broker-dealer, or a bank, may be affiliated with one or more of the depository institutions.

The present invention may be used in the context of these or other fund movement systems.

Block 620 comprises an operation of allocating, by the one or more computers, fund amounts to the depository institutions to be held in the aggregated deposit accounts therein based at least in part on the client account data for the client account funds and one or more rules. Note that a variety of rules may be applied in allocating the funds among the first plurality of depository institutions. For example, one rule comprises allocating funds to respective depository institutions so that funds held in the one or more aggregated deposit accounts in the respective depository institution do not exceed a maximum cap set for the respective depository institution, and/or to ensure that funds held in the one or more aggregated deposit accounts in a respective depository institution do not go below a minimum cap. Another rule may be based on allocating funds based on a depository institution stability rating. Another rule may allocate in order to minimize fund transfers into and/or out of the one or more aggregated deposit accounts held in the respective depository institution for a period of time. Another rule may allocate funds based on obtaining or retaining government backed insurance, e.g., allocating funds of a respective client account only to depository institutions which hold less than a specified amount of the funds of the respective client account. Another rule may be to allocate funds to a respective one of the depository institutions, based at least in part on whether the one depository institution has sourced funds to the program which are held in one or more other of the depository institutions. Another rule may be to allocate funds to a respective one of the depository institutions, based at least in part, on an amount of funds the one depository institution has sourced funds to the program which are held in one or more other of the depository institutions.

Block 630 comprises an operation of generating data for depositing/transferring funds to or withdrawing/transferring funds from at least one of the aggregated deposit accounts multiple times in a month period, based at least in part on the accessed client account data, the data generating step comprising generating data for instructions for making a withdrawal/transfer from funds held at one of the depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within the month period, and presenting instructions to the respective one depository institution using a method that counts against a 6 withdrawal limit for this set of the withdrawals during the month period. Any of the embodiments disclosed previously for element 530 may be implemented here. For example, in one embodiment, the set of at least one but not more than six withdrawals within the month period may be from the last six business days of the month period, and instructions may be presented to the respective one depository institution using a method that counts against a 6 withdrawal limit for this set of the withdrawals during the last six business days of the month period. In one embodiment, the instructions for withdrawal/transfer that count against a 6 withdrawal limit are presented in the last 5 business days of the month and are presented by electronic communication, such as by wire. For example, a last 6 withdrawals, or a last 5 withdrawals, or a last 4 withdrawals, etc., may be presented to the depository institution by wire, or other electronic communication method during this period.

Block 640 comprises an operation of updating or having updated, by the one or more computers, the one or more electronic databases to reflect changes in client account funds held in the aggregated deposit accounts.

As noted previously, the government backed insurance may be from the Federal Deposit Corporation Insurance. These embodiments may be implemented with a variety of different source institutions. However, in one embodiment, the method steps may be performed by a self-clearing broker dealer, and the accessing client account data comprises receiving deposit and/or withdrawal sweep data from one or more other broker dealers, with the deposit and/or withdrawal sweep data comprising deposit and/or withdrawal data for the respective clients having client accounts, which clients are associated with and are also customers of the one or more broker dealers. In one embodiment, the self-clearing broker dealer may also perform the steps of maintaining the plurality of government backed-insured and interest-bearing aggregated accounts in the depository institutions. In one embodiment, at least one of the aggregated accounts at one of the depository institutions may hold funds of multiple of the broker dealers. The self clearing broker dealer may also perform, by the one or more computers, an electronic accounting function on a substantially periodic basis based on client account data associated with the respective broker dealers, wherein the electronic accounting function may be performed for the client accounts of the associated broker dealer based on the one or more parameters associated with the respective broker dealer or the respective customer.

By way of example, one of the accounting parameters may comprise a type of rate to be paid one or more client accounts associated in the one or more databases with the broker dealer. In another embodiment, one of the accounting parameters may comprise a tier of a rate chart to be paid on funds of client accounts associated with the broker dealer based on a broker dealer rate parameter. In another embodiment, one of the accounting parameters may comprise one or more levels of FDIC insurance associated with different client accounts of the respective broker dealer. In another embodiment, one of the accounting parameters may comprise one or more depository institutions that are associated with the client accounts associated with the respective broker dealer for holding funds of those client accounts or are prohibited from holding funds of those client accounts. In another embodiment, one of the accounting parameters may comprise one or more of the depository institutions that are associated with only a subset of the broker dealers for holding funds of client accounts associated with only the subset of the broker dealers or are prohibited from holding funds of the subset of the broker dealers. In another embodiment, one of the accounting parameters may comprise a preferred method for customer initiated/late day transactions.

In a further embodiment, an operation may be performed of replacing at least a portion of money withdrawn of one of the broker dealers from one of the depository institutions by depositing money from another of the broker dealers into the one depository institution.

In a further embodiment, the self clearing broker dealer may maintain an accounting electronic database, on one or more computers, containing information on one or more accounting parameters to be applied when performing accounting functions relating to funds of a plurality of the client accounts of a plurality of the broker dealers.

In a further embodiment, an operation is performed of allocating, using the one or more computers, fund amounts of client accounts among the aggregated deposit accounts, to substantially match the respective amounts allocated to the aggregated deposit accounts based at least in part on the client account data for the client account funds and one or more rules.

In a yet further embodiment, a problem has been discovered when providing FDIC insurance for large single accounts by allocating funds across multiple program banks In current implementations separate aggregated accounts are set up for each different broker dealer at a plurality of the program banks But, many program banks are not interested in opening or maintaining such an aggregated account where the balance is less then some amount, e.g., $1-5 million. Part of the reason for this reluctance on the part of the program banks is the expense involved in maintaining the aggregated account for such a small amount coupled with attendant accounting issues. The accounting processing necessary for a broker dealer $BD_i$ having multiple customers is cumbersome and resource intensive. Another reason for this reluctance is the instability in the account balance that seems to flow from the size of the broker dealer $BD_i$. Note that this issue is particularly acute for self clearing broker dealers with a limited clientele with one or a few large customer accounts of, for example, $1,000,000. Insuring $1,000,000 with FDIC insurance would require a minimum of ten program banks, each holding the current FDIC limit for insurance from the large customer account. But a self clearing broker dealer with a limited clientele would not have enough funds from other of its customers to disperse among the ten program banks to make it profitable for the ten banks to service their respective program accounts. Also, such small balances tend to be less stable due to fund transfers of the broker dealer customers, e.g., it is difficult to maintain a stable level of assets at the bank. When this problem of finding FDIC insured banks to operate as program banks for such a small self clearing broker dealer is coupled with the accounting function now required for self clearing broker dealers, the situation for such small self clearing broker dealers becomes in many cases, untenable. Accordingly, it may be difficult to find program banks that will open a separate aggregated account for $1-5 million for a small broker dealer $BD_i$. Moreover, if a program bank does agree to maintain an aggregated account for such a small amount, the rate of interest it will agree to pay may be less than other significantly larger accounts.

FIG. 1 illustrates one embodiment of the invention wherein a self clearing broker dealer 100 provides an insured deposit program that causes sweep funds received at one or more intermediary banks 110 associated with the self clearing broker dealer, which funds represent deposits and withdrawals for customers of multiple other broker dealers $BD_1$-$BD_n$, to be allocated to and invested in aggregated accounts in a plurality of program banks 130-140 to thereby obtain FDIC insurance for single large accounts of over the current FDIC limit for insurance. Additionally, accounting functions are provided relating to deposits and withdrawals for the individual customer accounts of the broker dealers $BD_{1-n}$ and clearing reconciliation calculations are performed for the fund transfers. Note that in some embodiments, the intermediary bank 110 may function not only as the intermediary, but also as a program bank.

FIG. 1 illustrates the overall system and process for one embodiment. Each of lines $118_{1-n}$ illustrates the communication of one or more sweep files comprising credit and debit transactions of customers associated with the respective broker dealers $BD_{1-n}$ to the self clearing broker dealer 100. One or more settlement communication occur between a given broker dealer $BD_i$ and the self clearing broker dealer 100 to determine a net of aggregated credit and debit transactions of the customers of that broker dealer $BD_i$. The lines $115_{1-n}$ in one direction represent fund transfers (typically by wire) from the respective broker dealers $BD_{1-n}$ to the intermediary bank 110 in the situation where the net of the customer credits and debits is determined in the settlement to be a net credit. Lines $140_{1-n}$ in one direction represent the path for the wiring or other means of depositing funds to one or more of the program banks 130-140 in the situation where the settlement is a net credit. These lines $140_{1-n}$ in the other direction also represent the path for the movement of withdrawn funds from the program banks 130-140 to the control operating account at the intermediary bank 110, for dispersal to the appropriate broker dealer $BD_i$ via the lines $115_{1-n}$ in the case of a net withdrawal of funds. The lines $125_{1-n}$ represent the communication between the self clearing broker dealer 100 and the program banks 130-140 regarding the deposit of funds to or the withdrawal of funds from one or more of the program banks. In the situation where the settlement has determined that there is a net debit to be satisfied, one or more different methods of communication may be used to provide instructions for withdrawals (to be discussed below). Details of the electronic system for implementing the self clearing broker dealer 100 will be discussed in relation to FIG. 3.

Figure 2:
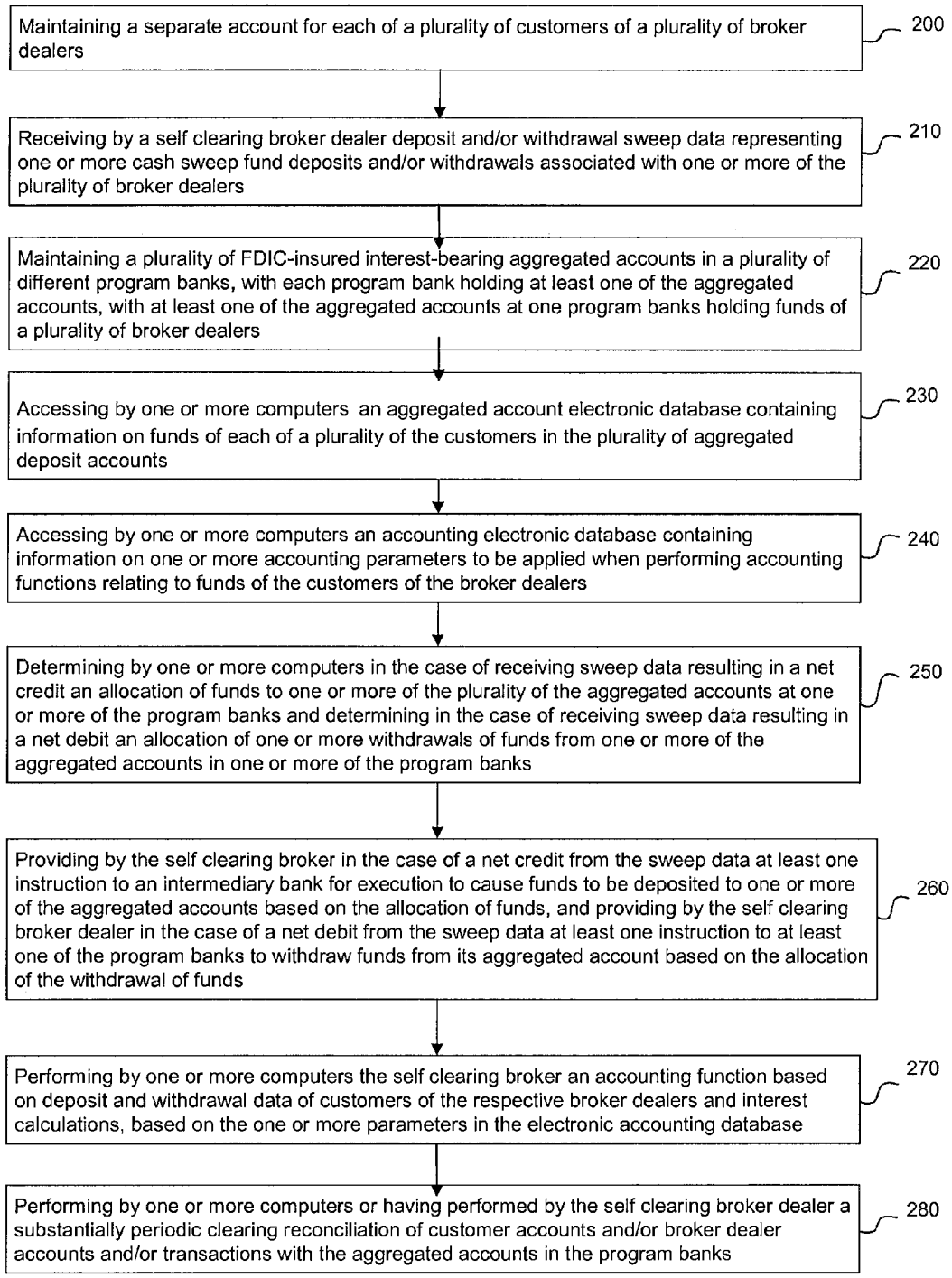
FIG. 2 is schematic block diagram of a flowchart of operations for one embodiment.

Referring now to FIG. 2, an embodiment of operations at the self clearing broker dealer 100 are illustrated. Block 200 illustrates an operation of maintaining or having maintained a separate account for each of a plurality of customers of a plurality of broker dealers $BD_{1-n}$.

Block 210 illustrates an operation of receiving by the self clearing broker dealer 100 deposit and/or withdrawal sweep data representing one or more cash sweep fund deposits and/or withdrawals associated with one or more of the plurality of broker dealers $BD_{1-n}$, with the deposit sweep data and/or withdrawal sweep data comprising deposit and withdrawal data for the respective customers of the one or more broker dealers $BD_{1-n}$. In one embodiment, this receiving operation would be performed by one or more computers over a network.

In one embodiment, the sweep data comprises fund deposit data for cash deposited by or for customers of the respective broker dealer $BD_i$ and withdrawals of funds to satisfy credit card or debit card or checking or other withdrawal activity of individual customers of the respective broker dealer $BD_i$. The sweep file will typically comprise customer activity from a single broker dealer $BD_{1-n}$ but could comprise a composite of deposit and withdrawal activity for customers of multiple broker dealers $BD_{1-n}$. In one embodiment, a settlement would be determined between the self clearing broker dealer 100 and the broker dealer $BD_i$ of a net amount comprising a net of the deposit and withdrawal data from the customers of the broker dealer $BD_i$. If the net amount is a credit, then the amount of the credit is wired by the broker dealer $BD_i$ to a control operating account in the intermediary bank 110. This deposit sweep data indicates that a net of customer deposits (excess cash in the customer accounts of the particular broker dealer $BD_i$) and withdrawals for the particular broker dealer $BD_i$ results in a net deposit. Alternatively, if the net amount determined in the settlement is a debit, then such a net withdrawal would be satisfied by withdrawal from one or more program banks (to be discussed below).

Block 220 illustrates an operation of maintaining a plurality of FDIC-insured and interest-bearing aggregated accounts at a plurality of different program bank 130-140, with each program bank holding at least one of the aggregated accounts, with at least one of the aggregated accounts at one of the program banks holding funds of a plurality of broker dealers $BD_{1-n}$. Details of the aggregated accounts will be provided below. In one embodiment, the aggregated account may comprise a single money market deposit account (MMDA). Alternatively, there may be two aggregated accounts, an MMDA paired with a demand deposit account (DDA). Alternatively, there may be a single aggregated NOW account for individuals. Alternatively, there may be an aggregated NOW account paired with an aggregated MMDA. Alternatively, there may be an aggregated NOW account for individuals paired with an aggregated MMDA and a DDA for institutional customers paired with the same MMDA.

Block 230 illustrates an operation of maintaining and/or accessing by one or more computers an aggregated account electronic database containing information on funds of each of a plurality of the customers held in the plurality of aggregated deposit accounts.

Block 240 illustrates an operation of maintaining and/or accessing by one or more computers an accounting electronic database containing information on one or more accounting parameters to be applied when performing accounting functions relating to funds of the customers of the broker dealers $BD_{1-n}$. Examples of such accounting parameters will be discussed below.

Block 245 illustrates an operation of making, by one or more computers, information accessible over the Internet to respective customers of one or more of the broker dealers on funds in the respective customer's account. In one embodiment, this information could be provided by populating a web page designated and/or customized for that customer alone, with data on the funds in the respective customer's account. Such information could comprise a balance in the respective customer's account, and/or information identifying the one or more program banks holding funds of the respective customer. In one embodiment, the web pages, with one or more such pages customized for each customer, would be provided on a Web server and made accessible by means of a customer browser, using ID and password controlled access. The information could be updated on the respective web page of the customer periodically, or upon customer access to his/her respective web page. The Web server could further be configured to allow the respective customers to deposit funds to and/or withdraw funds from their respective customer accounts via the Web access. In another embodiment, this information could be provided by sending or making accessible, periodically or upon request, or upon access to the database, an email or other electronic communication to a customer electronic appliance, such as a computer, or PDA, or cell phone.

Block 250 illustrates an operation of determining by one or more computers, in the case of receiving in block 210 fund data resulting in a net credit, an allocation of funds to one or more of the plurality of FDIC-insured and interest-bearing aggregated accounts at one or more of the aggregated accounts in the program banks 130-140, so that FDIC insurance coverage greater than the maximum FDIC insurance coverage allowed for a depositor for a single account is effectively provided for at least one customer, and for determining in the case of receiving in block 210 sweep data resulting in a net debit, an allocation of one or more withdrawals of funds from one or more program banks 130-140.

Block 260 illustrates an operation of providing by the self clearing broker dealer 100, in the case of a net credit from the sweep data, at least one instruction to the intermediary bank 110 for execution to cause funds to be deposited to one or more of the FDIC-insured interest-bearing aggregated accounts based on the allocation of funds determined in block 250. Likewise, in the case of a net debit from the sweep data, providing by the self clearing broker dealer at least one instruction to at least one of the program banks 130-140 to withdraw funds from its FDIC-insured interest-bearing aggregated account based on the allocation of the withdrawal of funds determined in block 250.

Block 270 illustrates an operation of performing by the self clearing broker dealer by one or more computers an electronic accounting function on a substantially periodic basis based on deposit and withdrawal data of the customers of the respective broker dealers $BD_{1-n}$, and performing interest calculations pertaining to funds of those customers, wherein the accounting function is performed for the customers of the associated broker dealers $BD_i$ based on the one or more parameters in the electronic accounting database associated with respective broker dealer $BD_i$ and/or the customer. In one embodiment, the accounting function comprises a record keeping function, whereby the system maintains a history for each customer account, which history includes transactions, interest earned and the program banks 130-140 holding funds of the particular customer account. A determination is made as to what customer account funds are held at which one or more program banks 130-140. One or more reports for the program banks and the respective broker dealers $BD_{1-n}$ may then be generated detailing which accounts have funds held at which program bank and in what amount.

In some embodiments the interest calculation can be fairly complex. For example, the system may track the aggregate interest distributed to customers of the broker dealers $BD_{1-n}$ from each aggregate account at a program bank and the revenue or fee to be paid to the self clearing broker dealer 100. For example, a given program bank may pay a fixed rate for funds for some predetermined period of time. However, the money in the aggregated account at the program bank may include funds from several broker dealers BD aggregated together by the self clearing broker dealer, with each broker dealer $BD_i$ entitled to a different rate of interest based on their respective agreement with the self clearing broker dealer. For example, a tiered interest rate based on the total amount of funds provided to the self clearing broker dealer could be used. Each customer of the given broker dealer $BD_i$ could likewise be earning a different interest rate from the broker dealer $BD_i$ based on the customer's agreement with the given broker dealer $BD_i$ (which also could be based on a tiered set of interest rates). Accordingly, the different broker dealers $BD_{1-n}$ could each be earning a different interest rate and the different customers of these different broker dealers $BD_i$ could each be earning a different interest rate for the same aggregated account at a program bank. Thus, it is possible to have one customer that is earning 3% and another customer earning 3.5% in the same aggregated account at a program bank.

As noted, in one embodiment the program bank agrees to pay a specific rate on the overall MMDA aggregated account balance. The self clearing broker dealer system may compute and then notify the program bank at month end what portion of the agreed upon rate is to be credited to the MMDA as interest and what portion should be paid to the self clearing broker dealer as a fee or revenue. Note that in order to maintain the pass thru on FDIC insurance for the underlying depositors, fee income to the broker dealer $BD_i$ or agent on the account is paid separately by the program bank.

Block 280 illustrates an operation of performing by the self clearing broker dealer 100 or an affiliate of the self clearing broker dealer or a third party, by one or more computers, a substantially periodic clearing reconciliation for customer accounts and/or broker dealer accounts and the aggregated accounts in the program banks. In one embodiment, this reconciliation calculates electronically if amounts held in one or more of the aggregated accounts in the plurality of program banks 130-140 equals the amounts held in respective customer accounts. Reconciliation is the process of ensuring that the aggregate balance for customer and/or broker dealer accounts maintained in the database and distributed to the program banks is equal to the aggregate balance maintained at the program banks 130-140. Reconciliation can be taken down to various levels. For example, a reconciliation calculation process may be used to ensure that if a customer account has a balance of $1 million in the program banks, that the sum of the balances listed in the database for that customer as held in the aggregated accounts among the program banks also equals $1 million. Alternatively or in addition, the system can also reconcile by individual broker dealer $BD_{1-n}$ e.g., to ensure that the amount in the customer accounts for that broker dealer $BD_i$ distributed to the program banks equal the sum of the amounts associated with that broker dealer $BD_i$ in the aggregated accounts at the various program banks. Alternatively or in addition, a reconciliation may be performed for sweep data received and funds transferred during a given period. The type of reconciliation calculation is not limiting on the invention.

In a further embodiment, an operation may be performed of determining by the self clearing broker dealer 100 on a substantially regular basis during a portion of the day a net transaction comprising a net of the sweep data files received over a period of time from a plurality of the broker dealers $BD_i$. For example, a net transaction could be calculated at 10 am, 4 pm and 6 pm. The determining electronically the allocation operation of block 250 would then be calculated based on the net of the sweep files received during this period of time.

In a further embodiment, an operation is performed of associating at least one accounting parameter with each of a plurality of the customer accounts and using that parameter in the electronic accounting operation of block 270.

In a further embodiment, an operation is performed of transferring by the self clearing broker dealer 100 of funds to a reserve account if a discrepancy, e.g., out of balance condition, is determined in the reconciliation operation of block 280.

In a further embodiment, the providing at least one instruction operation of block 260 comprises providing by the self clearing broker dealer 100 instructions to the intermediary bank 110 to cause funds to be deposited to a plurality of the program banks so that each of the plurality of the program banks holds funds from a plurality of the broker dealers BD.

In a further embodiment, the providing at least one instruction provided in the operation of block 260 requires use of a method of withdrawal that allows an unlimited number of withdrawals per month from one or more of the program banks 130-140 during a month while preserving an insured and interest-bearing status of the aggregated deposit accounts in the one or more program banks.

In a further embodiment, the method of withdrawal operation with respect to one or more of the program banks is substantially performed only by one or more of the following methods: in person, or by mail, or by messenger, or by telephone and distributed by mail, or by automated teller machine, or a combination thereof so that the insured and interest-bearing status of the aggregated deposit accounts is preserved. In a further embodiment, this restriction to one of the methods listed above does not begin to operate until a threshold number of withdrawals have been made from the aggregated account at the respective program bank. In a yet further embodiment, this restriction to one of the methods listed above for withdrawals made from the aggregated account at the respective program bank is imposed for a substantial portion of a month, and for the remainder of the month, e.g., a remaining 5 days, withdrawals are made by a method that counts against the 6 withdrawal limit, e.g., electronically, such as by wire.

In a further embodiment, the providing of at least one instruction operation of block 260 requires that no more than a predetermined number of withdrawals are made from any one aggregated account in a program bank during a predetermined period of time in order to preserve the interest-bearing status of that program bank. In one embodiment, the predetermined number is 6. Note that in U.S. Pat. No. 5,893,078 to Paulson, which is hereby incorporated by reference in its entirety, after 5 withdrawals from an account, the balance of the account is transferred to a demand deposit account.

In a further embodiment, the providing at least one instruction operation of block 260 requires that after a predetermined number of withdrawals during a predetermined period of time are made from any one aggregated account in a program bank, e.g., 5 in one month, then all of the funds in the account are withdrawn and transferred to another FDIC-insured interest-bearing aggregated account held at a different program bank. By way of example, see U.S. Pat. No. 4,985, 833 to Oncken, which is incorporated by reference herein in its entirety In a further embodiment, the providing at least one instruction operation of block 260 requires that no more than a predetermined number of withdrawals are made from any one aggregated account in a program bank during a predetermined period of time in order to preserve the interest-bearing status of that program bank. For example, in the case where the predetermined number is 6, then the six program banks may be used to ensure that at least one withdrawal may be made every day of a month.

In a further embodiment, the one or more accounting parameters referenced in block 240 comprise a type of rate to be paid one or more customers of the broker dealer $BD_{1-n}$ which may change based on a variety of factors.

In a further embodiment, the one or more accounting parameters referenced in block 240 comprise a tier of a rate chart to be paid on funds of the broker dealer $BD_i$ based on a broker dealer rate parameter.

In a further embodiment, the one or more accounting parameters referenced in block 240 comprise one or more levels of FDIC insurance associated with different customers of the broker dealer $BD_i$.

In a further embodiment, the one or more accounting parameters referenced in block 240 comprise one or more program banks that are associated with the customer of the broker dealer $BD_i$ for transferring funds of that customer, or are prohibited from receiving funds of the customer. For example, one of the customers of a given broker dealer $BD_i$ may have elected to not permit his/her funds to be deposited in a given program bank because he/she may already have an account at that bank.

In a further embodiment, the one or more accounting parameters referenced in block 240 comprise one or more program banks that are associated with only a subset of the broker dealers $BD_i$ for holding funds of the subset of the broker dealers, or are prohibited from holding funds of the subset of the broker dealers.

In a further embodiment, the one or more accounting parameters referenced in block 240 comprise a preferred method for customer initiated late day transactions. For example, the preferred method may comprise performing a late sweep file operation, where the broker dealer's customers are using checks or a debit card issued by that broker dealer $BD_{1-n}$ or it could comprise a cash performance account that might comprise cash management services such as providing self clearing broker dealer checks, cards, ACH, and/or Automated Bill Pay.

In a further embodiment, an operation is provided of obtaining account data for each of the plurality of program banks relating to their respective FDIC-insured and interest-bearing aggregated deposit account, and using that data to perform the electronic accounting function.

In a further embodiment, an operation is provided of managing deposits and withdrawals from the plurality of program banks to ensure that a minimum amount of deposits is maintained in at least one of the program banks. An embodiment of this feature is described in Ser. No. 11/767,827 filed on Jun. 25, 2007, which is incorporated by reference herein.

In a further embodiment, an operation is provided of replacing at least a portion of funds withdrawn of one of the broker dealers $BD_i$ from one of the program banks by depositing funds from another of the broker dealers $BD_i$ into the aggregated account held in that program bank. This operation is performed in some embodiments in order to maintain a stable amount at the given program bank.

In a further embodiment, an operation is provided of managing the deposits and withdrawals at the program banks 130-140 to ensure that a respective balance maintained at each of a plurality of the respective program banks is less than or equal to a cap related to assets at the respective program bank.

Among the network of program banks to which funds are to be allocated to obtain FDIC insurance over FDIC limit for one or more single accounts, at least one of those program banks holds aggregated funds of multiple broker dealers $BD_i$ in a single aggregated FDIC-insured interest bearing deposit account. In one embodiment, accounting functions and accounting parameters for each of the broker dealers $BD_i$ and/or their customers may be linked to the respective customer accounts. For example, a functionality based on broker dealer designated accounting parameters may be linked with the customer account. Thus, the broker dealer $BD_i$ or other party such as the self clearing broker dealer may set one or more parameters such as the following:

The type of rate to be paid to broker dealer customers (for example, tiered, not tiered);

The level of FDIC insurance based on a parameter;

Specify the program banks that are available to customers;

Specify that a given program bank may be assigned to all broker dealers $BD_{1-n}$ or may be assigned to only one broker dealer $BD_i$. (Example: a broker dealer $BD_i$ may choose to send the bulk of its customer funds to a sister company that is a bank unless one of its customer's balance exceeds the current FDIC limit for insurance);

Select a preferred method for customer initiated/late day deposit or withdrawal transactions, for example, via sending a late sweep file for situations where the broker dealer $BD_i$ has its own checks or debit cards, or for checks and debits received by a processing bank in the case where the self clearing broker dealer 100 has issued its own checks and debit cards to these customers.

In one embodiment, a sweep interface is provided for insured deposits, which may include in addition to transaction files, one or more of a bookkeeping file and/or acknowledgement file, position files that list the program banks containing customer funds, name and address files for opening or changing accounts, tier/household files (interest and other benefits are determined by the balance of all or substantially all of the accounts of the household), bank deposit files and month end files. The sweep interface is not limited to the files listed above, but may include other files.

Clearing Agreements—In one embodiment, a broker dealer $BD_i$ may have a limited clearing arrangement with the self clearing broker dealer 100 for the management of their customers' cash balances. The broker dealer $BD_i$ would sweep the customer excess cash balances (either all of the cash balance, or some amount exceeding a predetermined amount, for example) and withdrawals to the control operating account in the intermediary bank 110 that is registered in the name of the self clearing broker dealer or the like. The self clearing broker dealer would then allocate customer balances swept to the control operating account in the intermediary bank 110 for deposit into various program banks 130-140. The broker dealer $BD_i$ would have the option to continue to maintain all other clearing functions in this embodiment.

Intermediary Bank—In one embodiment, all funds exchanged between the broker dealers $BD_i$ the self clearing broker dealer 100 and the program banks 130-140 would pass-though one control operating account at the intermediary bank 110 registered as "[name of self clearing broker dealer or the like] as agent for the exclusive benefit of its deposit customers." Note that in other embodiments more than one control operating account could be utilized and more than one intermediary bank could be utilized. Thus, the recitation in the claims of an intermediary bank is intended to encompass one or more such accounts and/or intermediary banks Note that the intermediary bank may also, in some embodiments, be a program bank. Additionally, the intermediary bank, in some embodiments, may be a bank affiliated with the broker dealer $BD_i$.

Program Banks—In one embodiment, each program bank 130-140 would include at least one money market deposit account (MMDA)—demand deposit account (DDA) pair, each registered as "[of self clearing broker dealer or the like] as agent for the exclusive benefit of its deposit customers." The balances from the customers of the participating broker dealers $BD_{1-n}$ that clear thru the self clearing broker dealer 100 are deposited to the aggregated accounts in the different program banks, wherein customer funds from a plurality of broker dealers $BD_{1-n}$ are deposited in the same aggregated account in at least one of the program banks Note that one or more of the program banks may elect to use only an MMDA without pairing it with a DDA. Alternatively, one or more of the program banks may use a Now account by itself for an individual customer, or paired with an MMDA. Alternatively, one or more of the program banks may use a Now account for individual customers paired with an MMDA, and a DDA paired with the same MMDA for institutional customers. Additionally, one or more program banks, in some embodiments, may be affiliated with the broker dealer $BD_i$.

Self Clearing Broker Dealer Model

In one embodiment, the self clearing broker dealer offering FDIC sweep programs would maintain minimum net capital and would not be exempt from the requirements of Rule 15c3-3 under the Securities Exchange Act of 1934 pursuant to paragraph (k) thereof. The self-clearing broker dealer would then enter into a limited clearing arrangement with other broker dealers $BD_{1-n}$ for the management of their customers' cash balances. The broker dealer $BD_i$ would provide information concerning its customers' excess cash balances to the self clearing broker dealer 100. The self clearing broker dealer would send instructions to the broker dealer as to how customer balances would be allocated and deposited into the various program banks 130-140. The broker dealer would then sweep the customer balances, upon receiving these instructions from the self clearing broker dealer, directly to the intermediary bank. The broker dealer $BD_i$ would in this embodiment continue to maintain all other clearing functions.

In one embodiment, the self clearing broker dealer may enter into one or more agreements with the intermediary bank 110 and the program banks 130-140 as may be required by applicable laws, regulations and guidelines. The DDA and MMDA in the respective program banks 130-140 would be registered as "[Name of self clearing broker dealer or the like] 100 as agent for the exclusive benefit of its deposit customers acting for itself and others," to obtain pass-through FDIC insurance.

The self clearing broker dealer 100 would be the agent of record for the participating deposit customers of the various broker dealers BD. The participating customers via the terms and conditions of their agreement with their respective broker dealer $BD_i$ and or the self clearing broker dealer, would agree to appoint the self clearing broker dealer 100 as their agent, thereby granting the self clearing broker dealer 100 permission to move their funds between their customer account at their respective broker dealer $BD_{1-n}$, the intermediary bank 110 and the program banks 130-140.

The self clearing broker dealer 100 is responsible for the daily reconciliation calculation to ensure that its insured deposit sweep program is in balance. If necessary, the self clearing broker dealer 100 could separately reconcile the accounts for each participating broker dealer $BD_i$.

The self clearing broker dealer 100 in this embodiment may establish a sweep interface between itself and each participating broker dealer $BD_i$. The self clearing broker dealer 100 would be responsible for the movement of funds of the broker dealers $BD_{1-n}$ and would provide clearing services with respect to the participating program banks 130-140. The self clearing broker dealer 100 may also offer additional services such as check writing, debit card, credit card, ACH processing, and/or line bill pay services, to name a few.

Each broker dealer $BD_i$ would provide one or more daily sweep files that contains deposits and withdrawals. The self clearing broker dealer 100 processes each sweep file and runs the allocation process on the sweep file by itself, or on a plurality of the sweep files, either at that time, or on a periodic basis, such as every two hours, or at the bank cutoff time. The self clearing broker dealer 100 reviews the most recent allocation output and generates and provides instructions as to the movement of funds between the broker dealers $BD_{1-n}$, the intermediary bank 110 and the program banks 130-140. This process will be discussed in more detail below.

In another version of the allocation program, small accounts (e.g., less than the current FDIC limit for insurance) are initially spread across a substantial number of the program banks. See Ser. No. 12/025,402 filed on Feb. 4, 2008 for details of one embodiment of such small account distribution. In one embodiment, all or substantially all of the program banks receive a portion of the small accounts. When a sweep file is received during the day, for each customer account debit or deposit transaction in the received sweep file, the system selects for the allocation of the transaction one or more program banks that have been allocated or may be allocated funds for that particular customer account based on one or more rules. At the end of an AM sweep period, the system sends instructions to the intermediary bank 110 and the program banks to move the funds based on a net of the deposit and withdrawal allocations to the respective program banks. The process in one embodiment does not try to limit the number of program banks with fund wiring activity. Accordingly, in one embodiment the balances allocated to the different program banks are not set based on a set of bank target balances, but rather can float between a maximum cap and a minimum cap for the respective program banks, based on deposit and debit transactions allocated during the day, e.g., the system may allocate funds with a program bank up to the program bank's maximum cap and withdraw funds down to the program bank's minimum cap. If a program bank has a minimum and maximum cap that are set to be equal, the system in one embodiment will not process a withdrawal or deposit against the program bank unless the system has no other option. After the bank cutoff time, the balances at the respective program banks are fixed for the rest of the day. Note, however that the balance at the holdback bank can change based on PM sweep activity.

The system processes PM sweep files and CPA transactions (checks, debit cards, credit cards, ACH, to name a few) and posts the customer debit and credit transactions to the respective customer accounts. In one embodiment, the system then re-shuffles/reallocates customer accounts among the program banks based on a set of rules, but maintains the respective balances fixed at the program banks at the cutoff time. Any net debit activity from a PM sweep file and/or the aggregate net debit for CPA transactions (checks, debit cards, credit cards, ACH, to name a few) is satisfied from a holdback amount intended for that purpose. Any funds remaining in the control account in the intermediary bank are deposited into the hold back bank. Note that not every customer account that had a debit or credit transaction in the PM sweep file or a CPA transaction has funds in the hold back bank. Thus, a program bank that was initially allocated a customer account may be different from the program bank holding that account at the end of the day after a re-shuffle process.

The self clearing broker dealer 100 is responsible for ensuring that customer funds are properly deposited (in the case of a credit) from the intermediary bank 110 into one or more FDIC insured aggregated accounts in the program banks. The self clearing broker dealer is further responsible for determining that the insured deposit sweep program is in balance, and that all customer funds are properly accounted for as required by federal guidelines and Exchange Act Rule 15c3-3, as currently in effect or as may hereafter may be implemented under the same or different rule numbers. The self clearing broker dealer monitors, calculates and reports net capital on a periodic basis, such as a daily basis, per Exchange Act Rule 15c3-1. Note that Exchange Act Rule 15c3-3 (aka: The Customer Protection Rule) applies to self-clearing broker-dealers and requires a precise identification of customer funds on a daily basis.

Further note that in embodiments the self clearing broker dealer could register with the Securities Information Center as a "Direct Inquirer" for purposes of the Lost and Stolen Securities Program of the Securities and Exchange Commission. Also, the self clearing broker dealer may comply with the possession and control requirements of Exchange Act Rule 15c3-3, as currently in effect or as may hereafter may be implemented under the same or different rule numbers. Books and records required to be kept under federal regulations by self-clearing firms, include but are not limited to a pro forma stock record, Customer Reserve Formula, trial balance (with supports), and net capital computation as of the first day that self-clearing becomes effective.

Note that one or more of the following benefits may potentially be achieved:

- It is in many cases difficult for small broker dealers, e.g., those having less than $100 million in deposits, to set up an insured deposit sweep product because it is difficult to find enough program banks that are willing to take a small balance and pay a rate that is equivalent to the rate being paid on the larger accounts to make the system viable. Thus, the smaller broker dealer is at a competitive disadvantage. This difficulty may be eliminated in selected embodiments of the present design.
- A broker dealer $BD_i$ has the option to sign a limited clearing agreement with the self clearing broker dealer wherein the self clearing broker dealer only clears for cash sweeps. Thus, the self clearing broker dealer will clear for cash sweeps, but the broker dealer $BD_i$ can retain clearance responsibility for other parts of its business, or use a different broker dealer to clear a portion of its business.
- Consolidating the movement of funds to include the activity for all broker dealers $BD_{1-n}$ reduces the number of money movements. Due to a reduction in the number of transactions, bank transaction fees are also reduced, as is the potential for errors.
- Monthly transaction charges for multiple control operating accounts in one or more intermediary banks can be reduced in selected embodiments.
- Internal Costs may be reduced in some embodiments since Operations will be tracking one set of bank accounts for numerous broker dealers $BD_{1-n}$ as opposed to several sets of segregated accounts for each broker dealer $BD_i$.
- Additionally, one MMDA that contains the assets of several broker dealers $BD_i$ provides more stability for the respective program bank. The self clearing broker dealer 100 can better control how the assets are allocated though its modeling process and can shift assets from other broker dealers $BD_{1-n}$ as necessary to maintain a stable level of assets at a program bank.
- In this same respect, the self clearing broker dealer can better manage the assets that are allocated to the different program banks since it is not limited by the broker dealers $BD_i$ that can be attached to a particular program bank. Under the segregated programs, an individual broker dealer $BD_i$ must have an agreement with the program bank before assets can be transferred to that program bank.
- The invention is less costly for the program banks in some embodiments since they do not have to maintain an MMDA and DDA pair for each broker dealer $BD_i$.
- The number of legal agreements required between broker dealers and banks is reduced in some embodiments, as it is no longer necessary to have a separate agreement between each broker dealer $BD_i$ and the intermediary bank and the program banks Only one agreement between the self clearing broker dealer 100 and the participating banks is needed. Thus, it is much easier to add or change an intermediary bank or a program bank, and legal department agreement negotiation is significantly reduced. Likewise, the administrator in some embodiments will no longer have to obtain a separate legal opinion for each new broker dealer $BD_i$ that signs up for an insured deposit sweep program.
- The self clearing broker dealer is the self-clearing entity for the customer cash balances; therefore the self clearing broker dealer is the party responsible for complying with the federal guidelines. The broker dealers $BD_{1-n}$ that obtain clearing services thru the self clearing broker dealer can take advantage of the bank sweep program that is already setup. The broker dealer $BD_i$ is able to specify key attributes to meet the needs of its particular broker dealer firm. (e.g., FDIC Insurance, rate paid, choice of program banks, to name a few.)
- The broker dealer $BD_i$ can experiment with a bank sweep product without being required to commit extensive resources. The product could be offered to a limited group of clients in a specific region or test market or used to recruit representatives from a major wire house whose customers are using a bank sweep product. It is as simple as adding the insured bank product to its choice of sweep products. The self clearing broker dealer adds the broker dealer $BD_i$ to its system with agreed upon attributes or parameters.
- Prior to the present invention, a broker dealer $BD_i$ that wished to be self clearing only had the option of setting up a custom product, which required an extensive amount of work on the part of the broker dealer $BD_i$ and its chosen third party administrator.

Each broker dealer $BD_i$ in the program benefits from the participation of the other broker dealers $BD_i$. The self clearing broker dealer can negotiate better rates with program banks when it is dealing with larger pools of assets. Specifically, the program bank knows that the self clearing broker dealer can ensure that a certain percentage of the assets will remain stable. A bank may be willing to pay more for assets that have little or no volatility. Accordingly, the broker dealers $BD_i$ are not affected by the program bank's business needs. In contrast, for a custom self clearing program of an individual broker dealer, if a bank decides that it no longer needs the deposits, for example due to excessive volatility, the custom broker dealer may be forced to scramble to find a replacement bank willing to take the assets. In a large program with numerous program banks this typically would not happen, or if it did, the remaining program banks in the system can absorb the deposits of the program bank that decided to withdraw from the program.

First Example Embodiment Self Clearing Broker Dealer Work Flow Daily Processing

The accounts opened at the intermediary bank 110 and the program banks 130-140 are registered as "The self clearing broker dealer 100 as Agent for the exclusive benefit of its deposit customers acting for themselves and others."

All funds flow thru one or a selected set of control operating accounts in this embodiment.

Customer balances of at least some of the participating broker dealers $BD_{1-n}$ will be deposited in the same program bank accounts registered as "The Self Clearing Broker Dealer as Agent for exclusive benefit of its deposit customers acting for themselves and others."

The Broker Dealers $BD_{1-n}$ set the interest rate paid to their respective customers.

Broker Dealers $BD_{1-n}$ may provide a household tier file for their customers

Broker Dealer's customers may utilize the self clearing broker dealer's own Cash Performance Account—which may include cash management services (CPA) provided by the self clearing broker dealer comprising checks, debit cards, credit cards, ACH, and/or Automated Bill Pay, to name a few.

Broker Dealer $BD_i$ may provide both an AM sweep transaction file and a PM sweep transaction file.

I. Sweep File—AM (received before the bank cutoff time) Processing Example

A broker dealer $BD_i$ provides an AM sweep transaction file to the self clearing broker dealer 100. A settlement is reached between the broker dealer $BD_i$ and the self clearing broker dealer as to an amount to be credited or withdrawn. If the net activity is determined in the settlement to be a credit, then Broker dealer $BD_i$ wires funds to the intermediary bank 110 to be subsequently dispersed to the program banks by the self clearing broker dealer 100.

Then, at that time or at a later time, the self clearing broker dealer runs an allocation process based on that sweep file alone, or on a net of a plurality of sweep files, and generates and provides bank instructions to the intermediary bank to move funds to one or more of the program banks In one embodiment the net credit is applied to the program banks based on a set of rules. The customer accounts are re-allocated to fit into the updated program bank balances. In one embodiment, the objective is to limit the activity in the program banks while providing FDIC insurance for the customer accounts.

In another embodiment, the allocation process selects a program bank to credit for each transaction based on a set of rules. Although the net activity for a sweep file or a group of sweep files is a credit or a debit, the actual bank movements could comprise deposits to one or more program banks and withdrawals from one or more program banks. The net activity for all program banks would be equal to the net activity for the sweep files processed.

If the net activity in the AM sweep transaction file is determined in the settlement to be a debit, then The self clearing broker dealer 100 runs the allocation process at that time or at a subsequent time based on that sweep file alone, or on a net of a plurality of sweep files, and generates and provides bank instructions to one or more of the program banks to withdraw funds. Funds are then wired by one or more program banks to the intermediary bank 110. The self clearing broker dealer 100 instructs the intermediary bank 110 to wire the funds received from the program banks to the respective broker dealer(s) $BD_i$.

Just like the net credit, in one embodiment the net debit is applied to the program banks based on a set of rules. The customer accounts are re-allocated to fit into the updated program bank balances. The objective in this process may also be to limit the activity in the program banks while providing FDIC insurance for the customer accounts.

Just like for the net debit, in another embodiment the allocation process selects a program bank to debit for each transaction based on a set of rules. Although the net activity for a sweep file or a group of sweep files is a debit, the actual bank movements could comprise deposits to one or more program banks and withdrawals from one or more program banks. The net activity for all program banks would be equal to the net activity for the sweep files processed.

Prepaid Interest

The AM sweep file may contain full liquidations that require the withdrawal of both principle and interest. The program banks do not prepay interest in mid month. In this embodiment, the self clearing broker dealer 100 would prepay the interest at the time of the full liquidation. At month end, the self clearing broker dealer 100 would reimburse itself for the interest that was prepaid.

In another embodiment the broker dealer prepays the interest for his clients full liquidations. At month end the self clearing broker dealer would reimburse the broker dealer for the interest that was prepaid.

In another embodiment interest is not prepaid. Customers cannot withdraw the interest earned on their account until it is posted at month end.

II. Modeling Process for One Embodiment

In one embodiment, a modeling process determines minimum and maximum caps for the different program banks and is run after all the AM (pre-cutoff time) sweep files have been processed. The self clearing broker dealer 100 makes any necessary adjustments to the program bank caps. By way of example, this modeling process may be based on such parameters as total program bank assets and the assets of the aggregated account at that program bank. The modeling process also determines whether or not the system needs to add one or more new program banks. In one embodiment, each such program bank is assigned a maximum dollar amount that the system is willing to deposit up to. When a program bank has reached this maximum dollar balance, the modeling process may place a hold on any additional funds being deposited with that program bank. The modeling process may also be used to determine how many banks (at various assets levels) would need to be added if the program is to grow by X.)

III. Program Bank Allocation Process in One Embodiment

The Program Bank Allocation process determines which program banks 130-140 will receive either a deposit or a withdrawal. The allocation process may be run after the processing of a sweep file, or at any other convenient time, e.g., every 2 hours, or after the cutoff time for the banks, and may be based on a single sweep file or on multiple sweep files. Automatic emails are generated for the program banks that have activity, determining either a deposit or a withdrawal. The self clearing broker dealer 100 receives a daily report that includes the net daily activity for each program bank. The self clearing broker dealer 100 approves the allocation and initiates the movement of funds via instructions either to the intermediary bank and/or to one or more program banks or an instruction to the broker dealers.

Program Banks—Withdrawal Example Process

The self clearing broker dealer 100 provides an instruction using a method of instruction transfer to be discussed below. The program bank, upon receipt of the instruction, transfers funds from its MMDA to its DDA. The funds are then wired from the DDA to the intermediary bank 110.

IV. PM (After Bank Cutoff Time) Sweep Transactions & Cash Performance Account Activity In some embodiments, customer transactions (primarily withdrawals) may be received from some broker dealers $BD_i$ after the cutoff time for the programs banks. In this situation, the broker dealer $BD_i$ transmits a late file that contains transactions that were processed after the AM cutoff sweep. A second settlement takes place with the broker dealer $BD_i$ and funds are moved based on this settlement.

Cash Performance Account—the self clearing broker dealer may provide cash management services (CPA) to the customers of the broker dealers $BD_{1-n}$ which may comprise checks, debit cards, credit cards, ACH, and/or Automated Bill Pay, as noted above.

V. Hold Back Process

Funds are held back from at least one of the program banks in the AM (defined as before the bank cutoff time) allocation(s) to cover late withdrawals. The dollar amount held back is determined based on prior transaction history.

The AM allocation process thus includes the hold back amount, as part of its process. If the net activity for the AM allocation is a credit, the allocation process reduces the deposit to one or more of the program banks by the hold back amount. If the net activity for the AM allocation is a debit, the allocation process increases the dollar amount of the withdrawal by the hold back amount.

If late withdrawals are then received from the broker dealer $BD_i$ in a PM (after bank cutoff time) sweep file, the self clearing broker dealer 100 processes the file and wires funds to the broker dealer $BD_i$ from the amount that was held back.

If the late withdrawals are Cash Management Services (checks, debits, etc.) provided by the self clearing broker dealer 100, then the self clearing broker dealer 100 processes the transactions, and withdraws funds held back from the control operating account to pay for these Cash Management Service transactions.

Any funds held back but not utilized are deposited into the hold back bank at the end of the day. The PM allocation is run after PM sweep files, check, card and ACH files have been processed. The PM allocation process may also produce an uninsured report. If any accounts with balances below the program limit are uninsured, the re-allocation process may in some embodiment attempt to try to insure the accounts via an account swapping process.

VI. Nightly Process

In one embodiment, the self clearing broker dealer 100 provides the various broker dealers $BD_{1-n}$ with the end of day files including a position file that contains the program banks attached (holding the funds of) to each customer account. The nightly files may be customized for one or more broker dealers. The customer bank deposit file may be provided by the self clearing broker dealer 100 to the program banks and may, in some embodiments, include a customer account number of the associated broker dealer $BD_{1-n}$ a tax ID number, and a balance for that customer at the program bank, to name a few. The self clearing broker dealer updates the accrual for each account as specified by the broker dealer $BD_i$.

VII. Daily Reconciliation Software Process

The self clearing broker dealer 100 also reconciles daily with the intermediary bank 110 and each of the program banks 130-140. Any unfavorable differences are included as a customer liability when computing net capital, and as a credit in the broker-dealer's customer reserve computation. A transfer of funds to a reserve account is made to account for any deficiency determined in the reconciliation process.

VIII. Month End Process

The model in one embodiment uses an AM interest posting process at month end. Interest is paid on the morning of the last business day of the period. The self clearing broker dealer 100 then provides each broker dealer $BD_i$ with month end statement files per their specifications.

In another embodiment the self clearing broker dealer may post interest for select broker dealers on a day other than the last business day of the period. For example the broker dealer may elect to have interest posts on the $15^{th}$ of every month or on the $3^{rd}$ Friday of every month for his clients.

The invention is designed to operate in the context of a system comprising multiple program banks and a self clearing broker dealer. One intent of such an embodiment is to provide interest and FDIC insurance above the current FDIC limit for insurance for a single account for at least some of the customers of various broker dealers $BD_{1-n}$ and in the same system, perform accounting functions on the distribution of funds used to accomplish this intent. In one example embodiment, there could be eleven banks comprising program banks 1-10, and a holdback bank. (The number of banks used in this example is merely for explanatory purposes. More or less program banks can be used and more holdback banks can also be used consistent with the intent of the present invention, and one or more of the holdback banks may be program banks. Also other types of accounts may also be used in conjunction with the bank accounts, such as non-FDIC insured money market accounts to hold excess funds, consistent with the intent of the present invention). In the example, assume that a broker dealer $BD_i$ has a program offering $1 million of FDIC insurance per customer account. A customer A of this broker dealer $BD_i$ deposits $800,000 with the broker dealer. The system of this embodiment receives sweep data from this broker dealer $BD_i$ comprising purchase data and withdrawal data for a plurality of customers of that broker dealer $BD_{1-n}$ including the $800,000 purchase for customer A. These funds are first brought into the system via a control operating account in the intermediary bank 110. The system operates to distribute the purchases across the program banks 130-140. For the case of the $800,000 deposit for customer A, an amount of the current FDIC limit for insurance or less may be distributed to each of a plurality of the program banks to obtain insurance for the $800,000.

In more detail, FIG. 1 discloses one embodiment, comprising a self clearing broker dealer 100 that manages an aggregate interest-bearing account in each of a plurality of program bank 130-140, e.g., a money market deposit account (MMDA). In one embodiment, the MMDA is paired with an aggregate demand deposit account (DDA), both being in the identical name of the self clearing broker dealer or the like (referred to herein as an "MMDA-DDA pair"). In response to customer deposit and withdrawal transactions, sweep files with customer purchase and withdrawal transaction data are generated by the broker dealer $BD_i$ and sent to the self clearing broker dealer 100. The self clearing broker dealer 100 reaches a settlement with the broker dealer $BD_i$ on the amount of the sweep file net credit or net debit. In the case of a net credit, the broker dealer $BD_i$ then wires the net amount to the control operating account in the intermediary bank 110. The self clearing broker dealer 100 then initiates an appropriate transfer of funds from the intermediary bank 110 either to the different program banks 130-140 in the case of a credit to maximize insurance and based on various other rules, or from the program banks in the case of a debit.

As noted, in one embodiment the interest-bearing, insured aggregated accounts in which the managed balances for customers are deposited may be MMDA's each paired with a DDA. If the self clearing broker dealer 100 determines that it is necessary to move funds from a particular MMDA (at a particular program bank), first, it causes a messenger or other mechanism to have these funds transferred from the MMDA to the DDA member of the MMDA-DDA pair, and second, it causes the funds in the DDA to be moved to the self clearing broker dealer's control operating account at the intermediary bank 110. The self clearing broker dealer 100 may send instructions to the intermediary bank to make a further transfer of funds from the control operating account to another party, e.g., the broker dealer $BD_i$ or a third party transaction source (preferably by electronic or other automatic means). In contrast, if funds are to be transferred into a particular MMDA, the self clearing broker dealer 100 either may have them deposited into the associated DDA and then moved into the MMDA, or may have the funds deposited directly into the MMDA. The database listing customer funds is updated to reflect these funds transfers.

Note that money market deposit account (MMDA) and demand deposit account (DDA) are set up in each of the program banks so that the customer funds of multiple broker dealers $BD_{1-n}$ are commingled and aggregated in at least one of the program bank accounts, and preferably in multiple of the DDA-MMDA pairs. Thus, the self clearing broker dealer 100 does not have to set up a separate money market deposit account (MMDA) and associated demand deposit account (DDA) for each broker dealer $BD_i$ at the program bank, i.e., the same MMDA and/or DDA can be used across multiple broker dealers $BD_i$ if registered in the name of and offered by the self clearing broker dealer 100.

As noted above, in one embodiment, the aggregated accounts in the program banks are money market deposit accounts (MMDAs) registered in the name of the self clearing broker dealer 100 or the like that manages the program. However, any other suitable investment accounts may be used, such as NOW accounts for individuals, or DDA's. Moreover, more than one type of account may be used.

In one embodiment of an insured deposit program, multiple sweep files are received from one or more broker dealers $BD_i$ associated with the system 100 over the course of a period such as a day. Each sweep file contains transaction activity from one or more broker dealers $BD_i$. The timing and content of the received sweep file is determined as a matter of administrative convenience based on how the customer transactions are processed by their respective broker dealers $BD_{1-n}$. In one embodiment, a sweep file may comprise data for deposit and withdrawal transactions for one or more programs in which that broker dealer $BD_i$ is participating. Multiple sweep files may be received at the same or different times of the day. Similarly, in another embodiment, a given sweep file may be an aggregation of sweep files from a given broker dealer $BD_i$ and various correspondent entities.

An embodiment for processing sweep files will now be described. In one embodiment, each sweep file from a broker dealer $BD_i$ may be processed separately and the credits and debits allocated to the accounts of the respective customers associated with the credit and debit transactions. The allocation process may then be run at any time to determine electronically in the case of a credit from the sweep data, an allocation of funds to one or more of the plurality of FDIC-insured and interest-bearing aggregated accounts at the program banks, so that FDIC insurance coverage greater than the maximum FDIC insurance coverage for a single account is effectively provided for at least one customer and to determine electronically, in the case of a debit from the sweep data an allocation, of one or more withdrawals of funds from one or more program banks The allocation process can be run after the processing of each sweep file, or after all the sweep files have been processed, or it could be run at specific times during the processing day (for example every hour). In one embodiment, the allocation process is run after all the AM sweep files (defined as up to the bank cutoff time) have been processed. In a further embodiment, if a broker dealer $BD_i$ tended to run late, the system would not hold up the allocation processing for that one broker dealer $BD_i$. Rather, the system would run the process with the sweep files that have been received and then rerun the allocation process when the missing file is received.

Note that the instruction generating step does not need to follow immediately after the running of an allocation process. For example, the system could run the allocation process periodically, e.g., every two hours, but the system need not generate the instructions to move the funds between banks until the system had run the final allocation for the sweep files received before the bank cutoff time from the various broker dealers $BD_i$.

Processing for a First Sweep File:
i. First program bank target amount allocation—This process incorporates the first sweep purchases and redemptions into respective customer accounts. The process may further include any pre-paid interest, and holdback accounting. The process then allocates amounts to the respective program banks associated with the program based on one or more rules. Such rules may include, for example, ensuring that a given amount allocated to a program bank fits within a respective maximum bank cap and a minimum bank cap set for the respective program bank. In one embodiment, these allocated amounts may be target balance amounts that are fixed for the remainder of the period in order to minimize program bank wires. In such an embodiment, the first sweep is generally run as close to cutoff time as possible. Note that in other embodiments, the bank allocation amount may be fixed as part of a later sweep.
ii. A first account allocation—This process then allocates all customer accounts across the program banks participating in the system to fit the bank amount allocation above and attempts to obtain the maximum FDIC insurance under the particular program or programs associated with the sweep data.
iii. In another embodiment the system may spread the small accounts (less than the current FDIC limit for insurance) across all of the program banks and the allocation process may allocate each customer transaction to a specific program bank.

Processing for a subsequent one or more later sweeps:
i. A second transaction allocation—This processing incorporates second sweep purchases and redemptions into the respective customer accounts and then reallocates all accounts across the program banks to fit the fixed amounts allocated to the respective program banks.
ii. In a different embodiment, the allocation process may allocate each customer transaction in subsequent sweep files to a specific program bank without regard to any previously set fixed amount for the program bank.

As noted in the summary above, the self clearing broker dealer 100 is designed to run a first allocation that comprises two allocation processes: a bank amount allocation process, which allocates fund amounts between/among the banks 130-

140, and a customer account balance allocation among the plurality of the program banks to attempt to maximize insurance under the program.

The following describes this process in more detail:

First Bank Amount Allocation:

This process incorporates the first sweep purchases and redemptions into the respective customer accounts. The first bank allocation then assigns fund amounts to the program banks based on various rules, such as fitting within maximum bank caps, minimum bank caps. The process may also include a procedure for handling fully liquidated accounts and may incorporate a "holdback" amount from a holdback process into the bank amount totals.

A holdback process may also be used in one embodiment to receive late day activity (e.g., second dollar sweep data that includes late day customer purchase and withdrawal data). In the hold-back procedure for funding late withdrawals, funds are held back from one or more selected program banks, designated holdback banks, to cover the late withdrawals. A bank may be designated a holdback institution if it agrees to a temporary withdrawal of funds from its account which may be later used to settle late day customer service and fee transactions, for example, transactions for credit/debit cards/checks/ACH/fees, to name a few, that may become available for processing after the daily bank settlement deadline (the time after which the bank will not take new transactions), typically 4:00 pm. The amount held back from pre-cutoff transactions may be estimated based on prior transaction history. The holdback withdrawal process may be factored into the first runs and/or later runs of the bank allocation process on the sweep files. The allocation process will take into account the amount to be held back from a holdback bank in its distribution of funds allocated to or withdrawn from the given holdback bank. In one embodiment, if the net activity is a credit, the aggregate deposit to be allocated to the program banks is reduced by the hold back amount. For example, if the hold back amount is 5 million and the net activity is a credit of 10 million, the process would allocate 5 million to the program banks and leave the other 5 million in the control account in the intermediary bank 110 for late transactions. Any funds not used to cover late transactions would be deposited into the hold back.

To facilitate this process, in one embodiment a daily holdback amount is defined prior to the first bank amount allocation and the first account allocation. As noted, a balance at the holdback bank may either be reduced by the previously defined holdback amount at the end of the first or a later allocation. This money is debited from the holdback bank and wired and is credited to the program's control operating account which, in one embodiment, is held in the intermediary bank 110, which may or may not be a program bank. In a different embodiment, the amount held back in the control operating account for satisfying debits could come from reducing the net deposits to be allocated from the control operating account among the program banks. The account at the intermediary bank could comprise only a DDA control operating account, or it might comprise a DDA control operating account that also has an associated MMDA. The money is 'held back' with the intention of offsetting actual redemptions coming in with second or later sweep activity. The amount to be held back correlates, in one embodiment, to the historical transaction activity and/or number of broker dealers receiving clearing services from the self clearing broker dealer, as well as checking account, ACH, debit account activity, and line bill pay services, to name a few. Thus, in one embodiment, a holdback bank is designated and an amount of funds is determined to be held back, either from a deposit allocation to the program banks or by debiting the holdback bank, at least in part, based on a number of broker dealers who are receiving clearing services from the self clearing broker dealer and/or an amount of transaction activity of one or more of the broker dealers being cleared by the self clearing broker dealer.

In one embodiment of the process, all of the program banks in the program (except in some embodiments the holdback bank and/or a safety bank) receive one wire a day as part of the sweep processing and first bank account allocation. The bank balances resulting from the bank amount allocation and account allocation become 'target balances' for account allocations for subsequent sweep processing. Note that in some embodiments, the target balances for the aggregated accounts may be set after processing for a later sweep and allocation. Also, note that the use of target balances is one embodiment example, and the present design does not require use of target balances.

Referring to the bank amount allocation process, this allocation process may serve one or more of several purposes, such as, for example, to maintain substantially stable deposit funds at a program bank by the self clearing broker dealer 100 by limiting deposit/withdrawal activity, to ensure that activity at the banks 130-140 comply with federal regulations such as FDIC regulations, to ensure compliance with a credit policy, and to insure compliance with specific rules set by the customer, the broker dealer $BD_{1-n}$, or the branch.

First Account Allocation Processing:

In one embodiment, after the respective purchases and redemptions have been processed, the accounts are grouped by taxpayer identification number (TIN) and sorted in descending order based on total TIN balance (highest to lowest). The allocation proceeds account by account to determine which program banks will receive the customer balance (comprising the day's opening balance for the account, plus first sweep purchases, minus first sweep redemptions for each account). The allocation method distributes the account assets to the Program banks based on the TIN balance and based on the type of allocation business rules set for that customer account. Note that the business rules may be attributed to an account directly at the customer account level, or to multiple accounts at the broker or office/branch level.

The customer account balance allocation/reshuffling step may be subject to various additional account specific rules and broker dealer office and/or branch office level rules. In one embodiment of business rule priority, customer account specific rules may be used first to direct the customer account balance allocation. If the customer has opted out of a particular program bank, for example, because the customer has funds in that bank via an account with another financial entity, or the customer has designated that the first the current FDIC limit for insurance is to be deposited in a particular bank, then the customer account balance allocation will follow these rules in making the allocation of that customer's balance. Then the customer account balance allocation process follows broker dealer office/branch level allocation business rules in allocating multiple accounts of the given broker dealer $BD_i$ in an order and amount specified by the applicable rule(s). Thus, the customer account balance allocation process first allocates non-zero balance accounts according to customer account specific rules, then the process follows office/branch level Business Rules in a descending aggregated account balance order. Finally, the customer account balance allocation process allocates non-zero balance accounts not subject to any of the above applicable Business Rules in descending account balance order. The allocation/reshuffling of customer account balances may also follow certain other business rules to minimize the volume of account balance redistributions required to match with the program bank amount allocation. Likewise, a rule may be followed that no more than six withdrawals in a particular manner may be made from a given program bank during a period such as a month. Other allocation rules may be set by the individual account holder, the broker dealer $BD_{1-n}$ and the self clearing broker dealer 100.

Referring again to FIG. 1, the self clearing broker dealer 100 is configured to allocate and manage deposits, withdrawals and other transactions relating to each of the aggregated accounts in each of the program banks 130-140. The self clearing broker dealer system tracks the net activity for the aggregated accounts maintained by the self clearing broker dealer at the program banks 130-140 based on information generated by its own computers, e.g., instructions, wires and other communications, and/or from the sweep files sent by the broker dealers $BD_{1-n}$ to the self clearing broker dealer 100, and/or from other appropriate sources via contract or otherwise. The self clearing broker dealer system 100 maintains records on each broker dealer $BD_i$ and their respective customers with funds in one or more of the program banks managed by the self clearing broker dealer 100. Thus, in one embodiment, the self clearing broker dealer 100 maintains account records for all of the customer accounts of the broker dealers $BD_{1-n}$ with funds managed by the self clearing broker dealer 100.

As explained more fully below, the self clearing broker dealer 100 may automatically generate reports, for example, in the form of e-mail messages, text messages, faxes, etc., advising the broker dealers $BD_{1-n}$ of the day's net activity for the aggregated accounts in the multiple program banks holding funds for that broker dealer $BD_{1-n}$ and/or for activity in one or more customer accounts of that broker dealer $BD_i$. If more than one aggregated MMDA account is maintained at a given program bank, each account may be settled separately. The self clearing broker dealer 100 maintains or has maintained for it computer software and/or hardware located at a main management system site, or at one or more remote sites that are in communication with the self clearing broker dealer 100, and also maintains databases and other program functions to track the activities in the various aggregated accounts in each of the program banks 130-140. Examples of such computer software and/or hardware will be discussed below.

Subsequent Sweep Processing:

Account Processing:

As noted earlier, there may be multiple sweeps and multiple sweep processes run. When data for a last sweep of the day arrives (referred to in this embodiment as the "second sweep"), the second bank allocation process wires between the control operating account in the intermediary bank 110 and the holdback bank the net of the holdback amount and all second sweep transactions, including:

second sweep purchases second sweep redemptions.

Reports and wiring instructions are also generated from this process. This second bank allocation process allocates the transactions items to the respective customer accounts. As previously noted, in one embodiment the balances in the program banks from an earlier allocation during the day, or from a previous day, or after the first allocation become the target balances for the account allocation, for the remainder of the period. The second account allocation reallocates or reshuffles the individual accounts to banks to fit the target balances set previously at the respective program banks.

As noted for FIG. 1, the self clearing broker dealer 100 manages the withdrawal of funds from the program banks in order to satisfy a net debit. There are a variety of embodiments of the withdrawal process that may be implemented. In one embodiment, a manner of making the withdrawals from at least one of the FDIC-insured and interest-bearing deposit accounts preserves that account's interest-bearing status regardless of the number of the withdrawals and/or transfers from the at least one of FDIC-insured and interest-bearing aggregated account made during a month. This manner of making embodiment can be implemented by ensuring that no more than some predetermined number of withdrawals are made using a method that implicates the 6 withdrawal limit and that all other withdrawals from that account during the month are made either in person, or by mail, or by messenger, or by telephone and distributed by mail, or by automated teller machine, or a combination thereof so that the insured and interest-bearing status of the aggregated deposit accounts is preserved. As noted, in one embodiment, a restriction to one of the methods listed above for withdrawals made from the aggregated account at the respective program bank is imposed for a substantial portion of a month, but for the remainder of the month, e.g., a remaining 5 days, withdrawals are made by a method that counts against the 6 withdrawal limit, e.g., electronically, such as by wire.

Alternatively, after five withdrawals are made per se, or are made using a method that implicates the 6 withdrawal limit, then all or a portion of the funds in the MMDA can be transferred to a DDA at the same program bank.

Alternatively, a process can be used to ensure that no more than a predetermined number of withdrawals, e.g., 6, are made from the interest-bearing FDIC-insured aggregated account at the program bank during the period. If additional funds are required during the period, they are obtained via a withdrawal from another of the program banks. Accordingly, a withdrawal of funds from the overall program bank group can be made every day of the month, but the process is set to ensure that no more than some number such as 6 withdrawals are made from any one program bank during the period.

Figure 3:
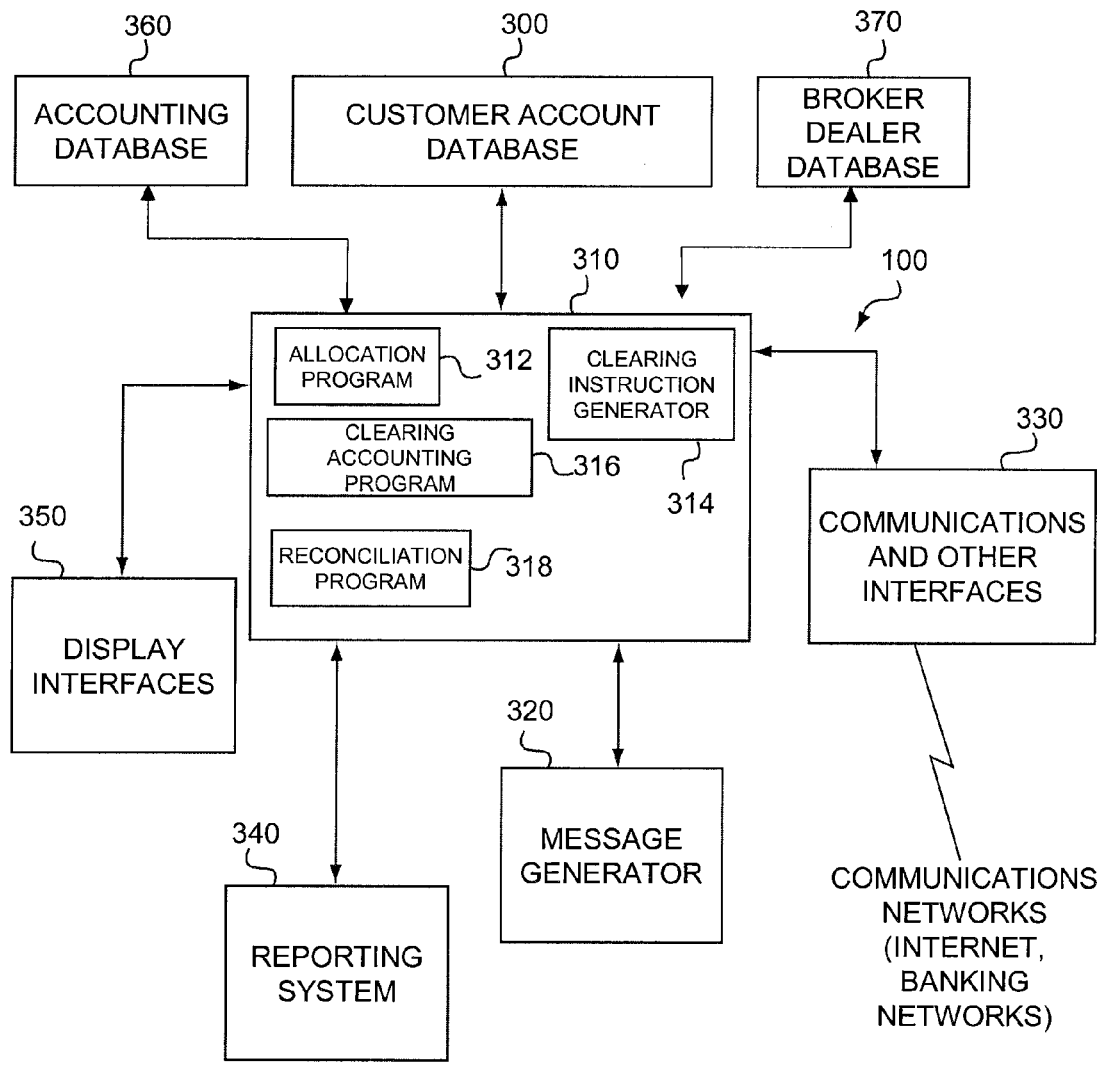
FIG. 3 is a schematic block diagram of an electronic system for implementing one or more of the embodiments of the invention.

FIG. 3 is a block diagram showing an Internet-based self clearing broker dealer system, generally designated by reference number 300, according to an exemplary embodiment of the present invention. It should be appreciated that the aggregated account self clearing broker dealer system 300 according to the present invention need not be Internet-based, but may instead, for example, be part of a closed network that allows limited access to bank and broker dealer records to obtain an enhanced level of security or it may be an open system with other means of security used. The self clearing broker dealer system 300 includes a memory, which may be a distributed memory, and which may comprise one or more databases. In the embodiment illustrated in FIG. 3, the memory comprises a customer database 305 for maintaining a separate account for each of the customers of the broker dealer clients of the self clearing broker dealer, with information on the funds of the customer and how they are distributed among the plurality of program banks 130-140. The memory may further comprise an accounting database 360 that includes parameters to be used in performing various accounting functions relating to the customer accounts, and a database 370 holding information on the various broker dealer clients of the self clearing broker dealer 100. Note that the three databases may be comprised in a single or in multiple memory structures and may be aggregated or separate. The self clearing broker dealer system further comprises a CPU 310 for executing a program bank allocation program 312, a clearing instruction generator program 314 that generates instructions for the intermediary bank 110 and the program banks 130-140 to move funds therebetween, an accounting program 316 for performing one or more accounting functions on the customer accounts and/or the broker dealer accounts including calculating interest, and a reconciliation program 318 for performing a reconciliation function. Program code for updating one or more of the databases based on the output from the accounting program 316 and the allocation program 312 is also provided. The CPU 310 executes code to perform the various management functions of the self clearing broker dealer system 300 and the different programs. The self clearing broker dealer system 300 communicates with the respective computer systems of one or more broker dealers $BD_{1-n}$, the program banks 130-140, and the intermediary bank 110 via one or more electronic portals to manage the aggregated accounts held at each program bank to maximize insurance for the funds in the various customer accounts and/or increase the safety of that money.

The bank allocation program 312 allocates the net of the deposit data and withdrawal data from the sweep files to the aggregated accounts in the program banks. The system further includes a message generator 320 that generates one or more messages regarding withdrawal of funds from or deposit of funds to each of the aggregated accounts in the program banks (Note that these messages are different from the instructions generated in the instruction generator 314.) Messages may, for example, be in the form of e-mail, facsimile, text message or other form of communication. Such messages may be sent to the broker dealers $BD_{1-n}$ and/or the program banks for providing notice of an action or request for approval of an action. For example, various messages may be exchanged between a respective broker dealer $BD_i$ and the self clearing broker dealer in reaching a settlement agreement for a given one or more sweep files. Additionally, messages may be generated that provide information on the amount withdrawn or deposited in various program banks. Additionally, messages may be generated providing information on deposits and withdrawals in individual customer accounts, the interest rate tiers currently being applied, and fund amounts associated with a given broker dealer $BD_i$ and the interest that the broker dealer $BD_i$ is obtaining based on that fund level.

Additionally, self clearing broker dealer system 300 may include a reporting system 340 for monitoring and generating reports on various aspects of the operation, including the customer account balances deposited in each of the program banks. Additionally, the system 300 may include a display interface 350 with local and/or remote monitoring. Additionally, the self clearing broker dealer system 300 may include communications and miscellaneous interfaces 330. The communications interface could connect to one or more electronic communications networks.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networked environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed:

1. A method, comprising:
(a) maintaining or having maintained or accessing, by one or more computers, an electronic database, on one or more computer readable media, comprising:
   (i) aggregated deposit account information for one or more of government backed-insured and interest-bearing aggregated deposit accounts, held in one or more depository institutions, comprising at least a first depository institution, each of the one or more aggregated deposit accounts holding funds of more than one client;
   (ii) client account information for a plurality of client accounts for a plurality of clients whose funds had been accepted for deposit in the names of the respective clients at the first depository institution;
(b) obtaining, by the one or more computers, a plurality of net credit/debit amounts during a month period, with each respective net credit/debit amount comprising a sum of credits to and/or debits with respect to multiple of the client accounts for a respective sub-period of the month;
(c) allocating, by the one or more computers, fund amounts to the depository institutions to be held in the aggregated deposit accounts therein based at least in part on the credit/debit amounts and one or more rules;
(d) generating data, by the one or more computers, for depositing/transferring funds to or withdrawing/transferring funds from at least one of the one or more aggregated deposit accounts multiple times in a month period, based at least in part on one or more of the net credit/debit the fund amounts allocated to the depository institutions for one or more sub-periods of time, the data generating step comprising generating data for instructions for making a withdrawal/transfer from funds held at one of the one or more depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within a last six business days of the month period, and presenting instructions to the respective one depository institution using a method that counts against a 6 withdrawal limit for this set of the withdrawals during the last six business days of the month period; and
(e) updating or having updated, by the one or more computers, the electronic database to reflect changes in client funds held in the one or more aggregated deposit accounts.

2. The method as defined in claim 1, wherein the instructions for withdrawal/transfer that count against a 6 withdrawal limit are presented in each of the last 5 business days of the month and are presented by electronic communication.

3. The method as defined in claim 1, wherein the government backed insurance is Federal Deposit Corporation Insurance.

4. The method as defined in claim 1, wherein the one or more depository institutions comprises only the first depository institution.

5. The method as defined in claim 1, wherein the one or more depository institutions comprise a plurality of depository institutions.

6. The method as defined in claim 1, wherein the one or more depository institutions comprise a plurality of depository institutions, and wherein the generating data for instructions to deposit/transfer funds to or withdraw/transfer funds from the one or more aggregated deposit accounts based at least in part on one or more of the net credit/debit amounts further comprises:
transferring funds of a respective client only to one or more depository institutions which hold less than a specified amount of the funds of the respective client account.

7. A method, comprising:
maintaining or having maintained or accessing, by one or more computers, one or more electronic databases, stored on one or more computer-readable media, comprising:
   (i) aggregated deposit account information for a plurality of respective government-backed insured and interest-bearing aggregated deposit accounts held in a plurality of depository institutions participating in a program, with the aggregated deposit accounts providing non-penalized liquidity for the funds held therein, each of the one or more aggregated deposit accounts holding funds of more than one client; and
   (ii) client account information for a plurality of client accounts, the client account information for a respective one of the client accounts comprising a balance of client account funds held in each of one or more of the aggregated deposit accounts holding funds of the respective client account; and
accessing, by the one or more computers, client account data comprising changes to client account funds sourced to the program from one or more source financial entities and held or to be held in the depository institutions in aggregated accounts held therein;
allocating, by the one or more computers, fund amounts to the depository institutions to be held in the aggregated deposit accounts therein based at least in part on the client account data for the client account funds and one or more rules;
generating data, by the one or more computers, for depositing/transferring funds to or withdrawing/transferring funds from at least one of the aggregated deposit accounts multiple times in a month period, based at least in part on the accessed client account data, the data generating step comprising generating data for instructions for making a withdrawal/transfer from funds held at one of the depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within a last six business days of the month period, and presenting instructions to the respective one depository institution using a method that counts against a 6 withdrawal limit for this set of the withdrawals during the last six business days of the month period; and
updating or having updated, by the one or more computers, the one or more electronic databases to reflect changes in client account funds held in the aggregated deposit accounts.

8. The method as defined in claim 7, wherein the instructions for withdrawal/transfer that count against a 6 withdrawal limit are presented in the last 5 business days of the month and are presented by wire.

9. The method as defined in claim 7, wherein the method of presentation of the instructions for withdrawal/transfer that counts against the 6 withdrawal limit is by an electronic method.

10. The method as defined in claim 7, wherein the government backed insurance is from the Federal Deposit Corporation Insurance.

11. The method as defined in claim 7, wherein one of the one or more rules for allocation comprises allocating funds of a respective client account only to one or more depository institutions which hold less than a specified amount of the funds of the respective client account.

12. The method as defined in claim 7, wherein one of the one or more rules for allocation comprises allocating funds to respective depository institutions so as not to exceed a maximum cap for the respective depository institution and/or not to go below a minimum cap for the respective depository institution.

13. The method as defined in claim 7, wherein one of the one or more rules for allocation comprises allocating funds to a respective one of the depository institutions based, at least in part, whether the one depository institution has sourced funds to the program which are held in one or more other of the depository institutions.

14. The method as defined in claim 7, wherein one of the one or more rules for allocation comprises allocating funds to a respective one of the depository institutions based, at least in part, on an amount of funds the one depository institution has sourced funds to the program which are held in one or more other of the depository institutions.

15. The method as defined in claim 7, wherein one of the one or more rules for allocation comprises allocating an amount of funds to a respective one of the depository institutions based, at least in part, on an amount of funds the one depository institution has sourced funds to the program which are held in one or more other of the depository institutions.

16. The method as defined in claim 7, further comprising:
allocating, using the one or more computers, fund amounts of client accounts among the aggregated deposit accounts, to substantially match the respective fund amounts allocated to the aggregated deposit accounts, based at least in part on the client account data for the client account funds and one or more rules.

17. The method as defined in claim 7, wherein the method steps are performed by a self-clearing broker dealer, and
wherein the accessing client account data comprises receiving deposit and/or withdrawal sweep data from one or more other broker dealers, with the deposit and/or withdrawal sweep data comprising deposit and/or withdrawal data for respective customers holding customer accounts with the one or more broker dealers.

18. The method as defined in claim 17, further comprising the self-clearing broker dealer performing the steps:
maintaining the plurality of government backed-insured and interest-bearing aggregated accounts in the depository institutions, with at least one of the aggregated accounts at one of the depository institutions holding funds of multiple of the broker dealers;
performing, by the one or more computers, an electronic accounting function on a substantially periodic basis based on client account data associated with the respective broker dealers, wherein the electronic accounting function is performed for the client accounts of the associated broker dealer based on one or more accounting parameters associated with the respective broker dealer or the respective customer.

19. The method as defined in claim 18, wherein the one or more accounting parameters comprise a type of rate to be paid one or more client accounts associated with the respective broker dealer.

20. The method as defined in claim 18, wherein the one or more accounting parameters comprise a tier of a rate chart to be paid on funds of client accounts associated with the broker dealer.

21. The method as defined in claim 18, wherein the one or more accounting parameters comprise one or more levels of FDIC insurance associated with client accounts associated with the respective broker dealer.

22. The method as defined in claim 18, wherein the one or more accounting parameters comprise one or more depository institutions that are associated with the client accounts associated with a respective one of the respective broker dealers for holding funds of those client accounts or are prohibited from holding funds of those client accounts.

23. The method as defined in claim 18, wherein the one or more accounting parameters comprise one or more of the depository institutions that are associated with only a subset of the broker dealers for holding funds of only the subset of the broker dealers or are prohibited from holding funds of the subset of the broker dealers.

24. The method as defined in claim 18, wherein the one or more accounting parameters comprise a preferred method for customer initiated/late day transactions.

25. The method as defined in claim 17, further comprising replacing at least a portion of money withdrawn of one of the broker dealers from one of the depository institutions by depositing money from another of the broker dealers into the one depository institution.

26. The method as defined in claim 17, further comprising the self clearing broker dealer maintaining an accounting electronic database, on one or more computers, containing information on one or more accounting parameters to be applied when performing accounting functions relating to funds of a plurality of the client accounts of a plurality of the broker dealers.

27. A method, comprising:
maintaining or having maintained or accessing, by one or more computers, one or more electronic databases, stored on one or more computer-readable media, comprising:
(i) aggregated deposit account information for a plurality of respective government-backed insured and interest-bearing aggregated deposit accounts held in a plurality of depository institutions participating in a program, with the aggregated deposit accounts providing non-penalized liquidity for the funds held therein, each of the one or more aggregated deposit accounts holding funds of more than one client; and
(ii) client account information for a plurality of client accounts, the client account information for a respective one of the client accounts comprising a balance of client account funds held in each of one or more of the aggregated deposit accounts holding funds of the respective client account; and
accessing, by the one or more computers, client account data comprising changes to client account funds sourced to the program from one or more source financial entities and held or to be held in the depository institutions in aggregated accounts held therein;
allocating, by the one or more computers, fund amounts to the depository institutions to be held in the aggregated deposit accounts therein based at least in part on the client account data for the client account funds and one or more rules;

generating, by the one or more computers, data for depositing/transferring funds to or withdrawing/transferring funds from at least one of the aggregated deposit accounts multiple times in a month period, based at least in part on the accessed client account data, the data generating step comprising generating data for instructions for making a withdrawal/transfer from funds held at one of the depository institutions more than six (6) times during the month period, comprising presenting instructions to the respective one depository institution using one or more of the methods: in person, or by mail, or by messenger, or by telephone and distributed by mail, or by automated teller machine, or a combination thereof for substantially all of the withdrawals/transfers except for a set of at least one but not more than six withdrawals within the month period, and presenting instructions to the respective one depository institution using a method that counts against a 6 withdrawal limit for this set of the withdrawals during the month period; and updating or having updated, by the one or more computers, the one or more electronic databases to reflect changes in client account funds held in the aggregated deposit accounts.

28. The method as defined in 7, wherein the changes to client account funds are sourced from a plurality source financial entities.

29. The method as defined in 27, wherein the changes to client account funds are sourced from a plurality source financial entities.

* * * * *